(12) United States Patent
Kamiya

(10) Patent No.: US 12,420,385 B2
(45) Date of Patent: Sep. 23, 2025

(54) SCREWDRIVER

(71) Applicant: MAKITA CORPORATION, Anjo (JP)

(72) Inventor: Takeshi Kamiya, Anjo (JP)

(73) Assignee: MAKITA CORPORATION, Anjo (JP)

( * ) Notice: Subject to any disclaimer, the term of this patent is extended or adjusted under 35 U.S.C. 154(b) by 385 days.

(21) Appl. No.: 18/198,875

(22) Filed: May 18, 2023

(65) Prior Publication Data

US 2024/0017382 A1    Jan. 18, 2024

(30) Foreign Application Priority Data

Jul. 14, 2022    (JP) .................................. 2022-113253

(51) Int. Cl.
*B25B 21/00*    (2006.01)
*B23Q 5/20*    (2006.01)

(52) U.S. Cl.
CPC .............. *B25B 21/00* (2013.01); *B23Q 5/20* (2013.01)

(58) Field of Classification Search
CPC ..... B25B 23/0064; B25B 21/00; B25B 23/14; B25B 23/141; B23Q 5/20
See application file for complete search history.

(56) References Cited

U.S. PATENT DOCUMENTS

| 8,944,181 | B2 * | 2/2015 | Sato ........................ B25F 5/003 173/217 |
| 9,827,660 | B2 * | 11/2017 | Blum .................. B25D 11/104 |
| 2002/0130007 | A1 * | 9/2002 | Nakamura .............. B25B 21/00 173/217 |
| 2002/0178877 | A1 | 12/2002 | Kikuchi et al. |
| 2004/0231952 | A1 * | 11/2004 | Nakamura .............. B25F 5/001 192/223 |

FOREIGN PATENT DOCUMENTS

| JP | 2003-25244 A | 1/2003 |
| JP | 2004-181545 A | 7/2004 |
| JP | 2008-149437 A | 7/2008 |
| JP | 2010-274366 A | 12/2010 |
| JP | 5382430 B2 | 1/2014 |

* cited by examiner

*Primary Examiner* — Nathaniel C Chukwurah
(74) *Attorney, Agent, or Firm* — Oliff PLC

(57) ABSTRACT

A screwdriver allows a screwing operation and an unscrewing operation to be performed smoothly. A screwdriver includes a housing, a motor including a stator and a rotor, a spindle, a clutch assembly, and a spindle locking assembly. The spindle includes a rod to which a tip tool is attachable, and is supported by the housing in a manner movable between an advanced position and a retracted position in a front-rear direction. The spindle has a reception hole extending frontward from a rear end face of the spindle. The clutch assembly transmits a rotational force from the rotor to the spindle in response to the spindle moving to the retracted position during forward rotation of the rotor. The spindle locking assembly transmits a rotational force from the rotor to the spindle during reverse rotation of the rotor, and includes the reception hole, and a countershaft placed in the reception hole.

20 Claims, 38 Drawing Sheets

FIG. 23  FORWARD ROTATION WITH NO PRESSING OPERATION

FORWARD ROTATION WITH NO PRESSING OPERATION

FIG. 27  FORWARD ROTATION WITH PRESSING OPERATION

FORWARD ROTATION WITH PRESSING OPERATION

REVERSE ROTATION WITH NO PRESSING OPERATION

FIG. 35 REVERSE ROTATION WITH PRESSING OPERATION

SCREWDRIVER

CROSS-REFERENCE TO RELATED APPLICATIONS

This application claims the benefit of priority to Japanese Patent Application No. 2022-113253, filed on Jul. 14, 2022, the entire contents of which are hereby incorporated by reference.

BACKGROUND

1. Technical Field

The present disclosure relates to a screwdriver.

2. Description of the Background

In the technical field of screwdrivers, a known screwing machine is described in Japanese Patent No. 5382430.

BRIEF SUMMARY

Screwdrivers are used to perform a screwing operation for tightening screws on workpieces. A technique for performing an unscrewing operation for removing screws smoothly from workpieces with a screwdriver is awaited.

One or more aspects of the present disclosure are directed to a screwdriver that allows a screwing operation and an unscrewing operation to be performed smoothly.

A first aspect of the present disclosure provides a screwdriver, including:
 a housing;
 a motor including a stator and a rotor rotatable relative to the stator;
 a spindle including a rod to which a tip tool is attachable, the spindle being supported by the housing in a manner movable between an advanced position and a retracted position in a front-rear direction, the spindle having a reception hole extending frontward from a rear end face of the spindle;
 a clutch assembly configured to transmit a rotational force from the rotor to the spindle in response to the spindle moving to the retracted position during forward rotation of the rotor; and
 a spindle locking assembly configured to transmit a rotational force from the rotor to the spindle during reverse rotation of the rotor, the spindle locking assembly including
  the reception hole, and
  a countershaft placed in the reception hole.

A second aspect of the present disclosure provides a screwdriver, including:
 a housing;
 a motor including a stator and a rotor rotatable relative to the stator;
 a spindle including a rod to which a tip tool is attachable, the spindle being supported by the housing in a manner movable between an advanced position and a retracted position in a front-rear direction;
 a clutch assembly configured to transmit a rotational force from the rotor to the spindle in response to the spindle moving to the retracted position during forward rotation of the rotor; and
 a spindle locking assembly configured to transmit a rotational force from the rotor to the spindle during reverse rotation of the rotor, the spindle locking assembly including
  a shaft rotatable by the rotor,
  a cylindrical portion surrounding the shaft,
  a lock pin between an outer circumferential surface of the shaft and an inner circumferential surface of the cylindrical portion, and
  a pin groove located on the inner circumferential surface of the cylindrical portion and receiving at least a part of the lock pin.

The screwdriver according to the above aspects of the present disclosure allows a screwing operation and an unscrewing operation to be performed smoothly.

DETAILED DESCRIPTION

One or more embodiments will now be described with reference to the drawings. The components in the embodiments described below may be combined as appropriate. One or more components may be eliminated.

In the embodiments, the positional relationships between the components will be described using the directional terms such as right and left (or lateral), front and rear (or frontward and rearward), and up and down (or vertical). The terms indicate relative positions or directions with respect to the center of a screwdriver 1. The screwdriver 1 according to the embodiments includes a spindle 9 that rotates about a rotation axis CX.

In the embodiments, a direction parallel to the rotation axis CX is referred to as an axial direction or axially for convenience. A direction about the rotation axis CX is referred to as a circumferential direction or circumferentially, or a rotation direction for convenience. A direction radial from the rotation axis CX is referred to as a radial direction (or radially) for convenience.

A predetermined axial direction away from the center of the screwdriver 1, or a position farther from the center of the screwdriver 1 in the predetermined axial direction, is referred to as a first axial direction for convenience. The direction opposite to the first axial direction is referred to as a second axial direction for convenience. A predetermined circumferential direction is referred to as a first circumferential direction for convenience. The direction opposite to the first circumferential direction is referred to as a second circumferential direction for convenience. A radial direction away from a rotation axis AX, or a position farther from the rotation axis AX in the radial direction, is referred to as radially outward for convenience. The direction opposite to radially outward is referred to as radially inward for convenience.

In the embodiments, the axial direction corresponds to the front-rear direction. The first axial direction may be from the rear to the front, and the second axial direction may be from the front to the rear.

Screwdriver

Figure 1:
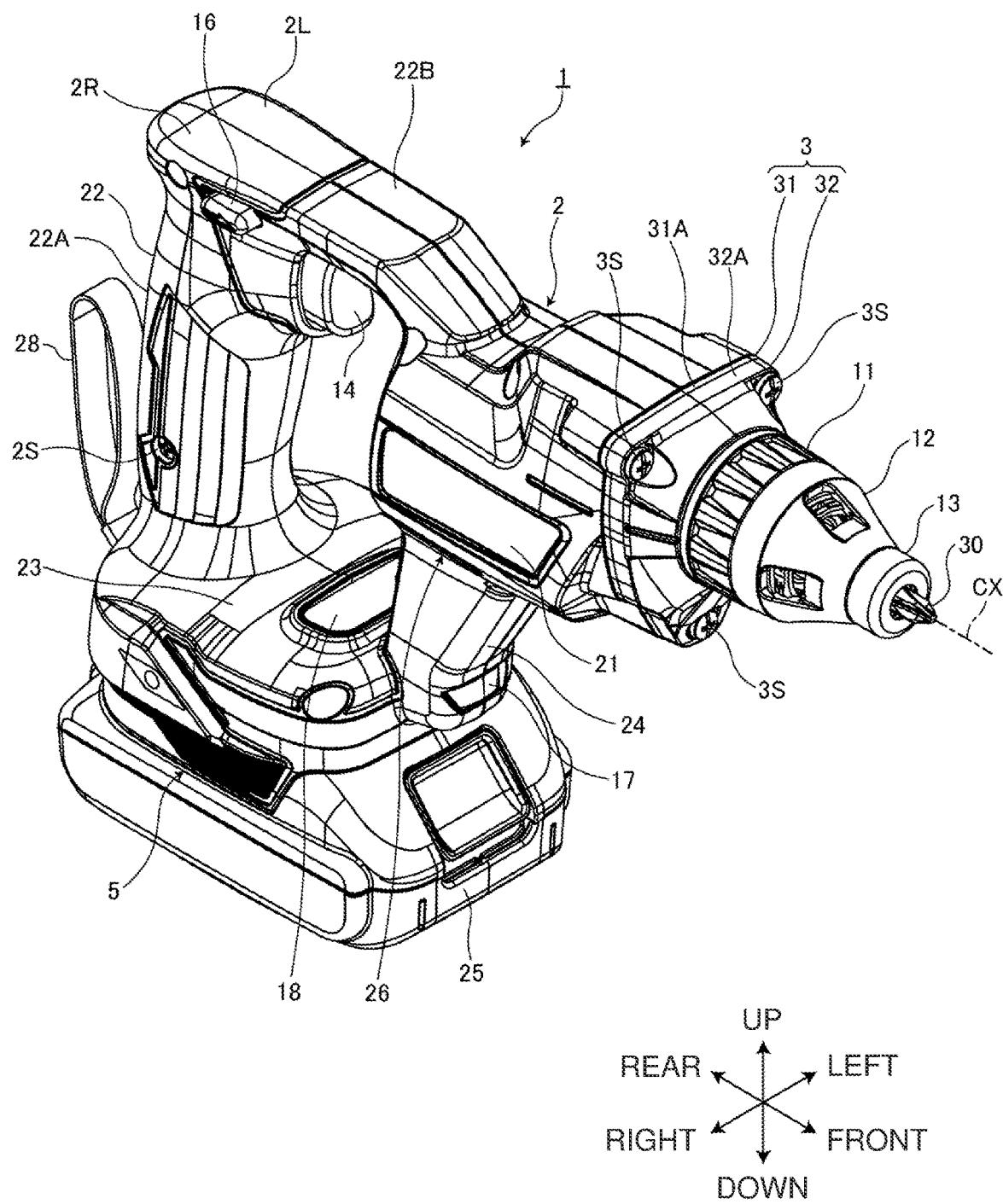
FIG. 1 is a perspective view of a screwdriver according to an embodiment as viewed from the front.
Figure 2:
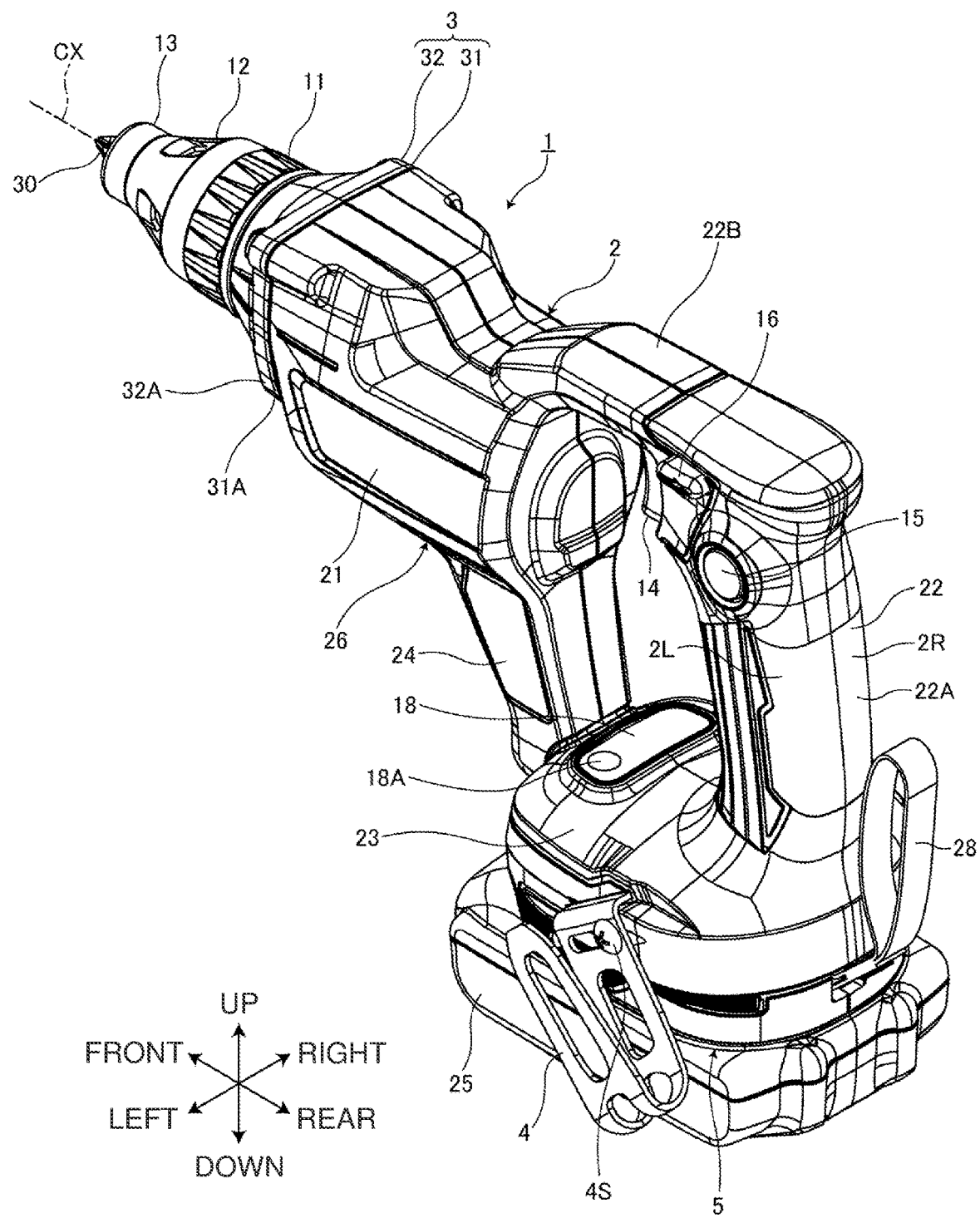
FIG. 2 is a perspective view of the screwdriver according to the embodiment as viewed from the rear.
Figure 3:
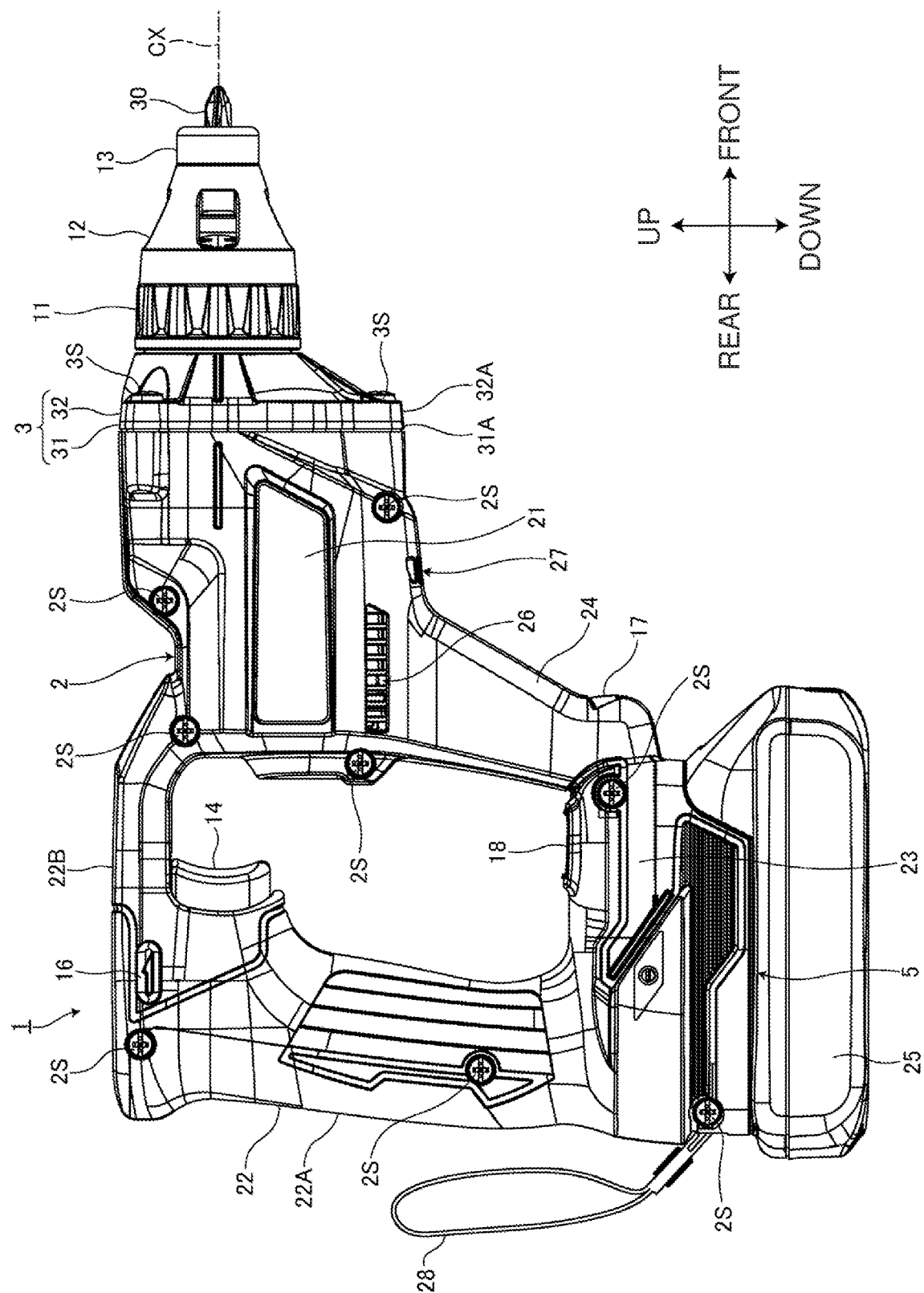
FIG. 3 is a side view of the screwdriver according to the embodiment.
Figure 4:
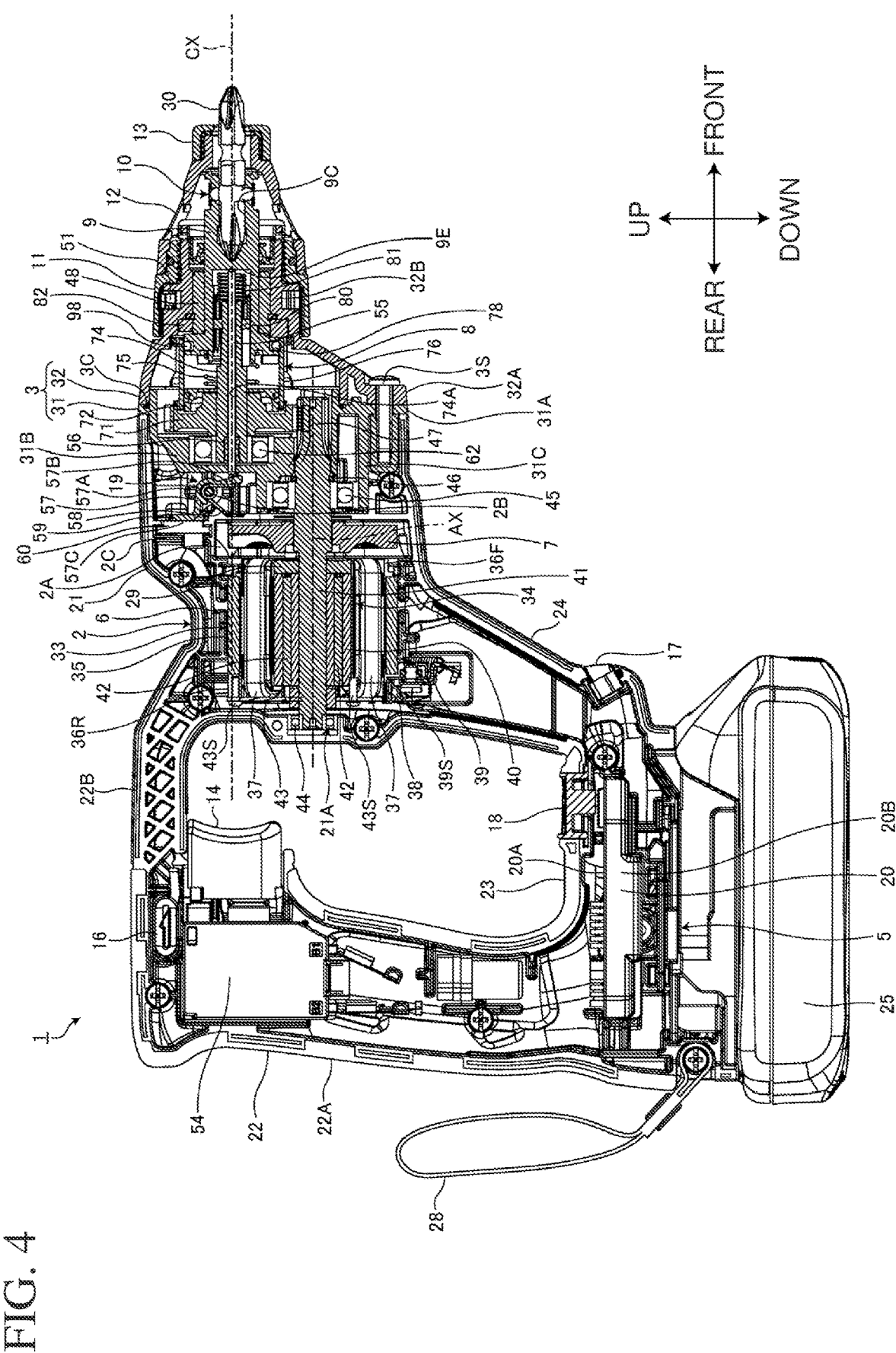
FIG. 4 is a longitudinal sectional view of the screwdriver according to the embodiment.
Figure 5:
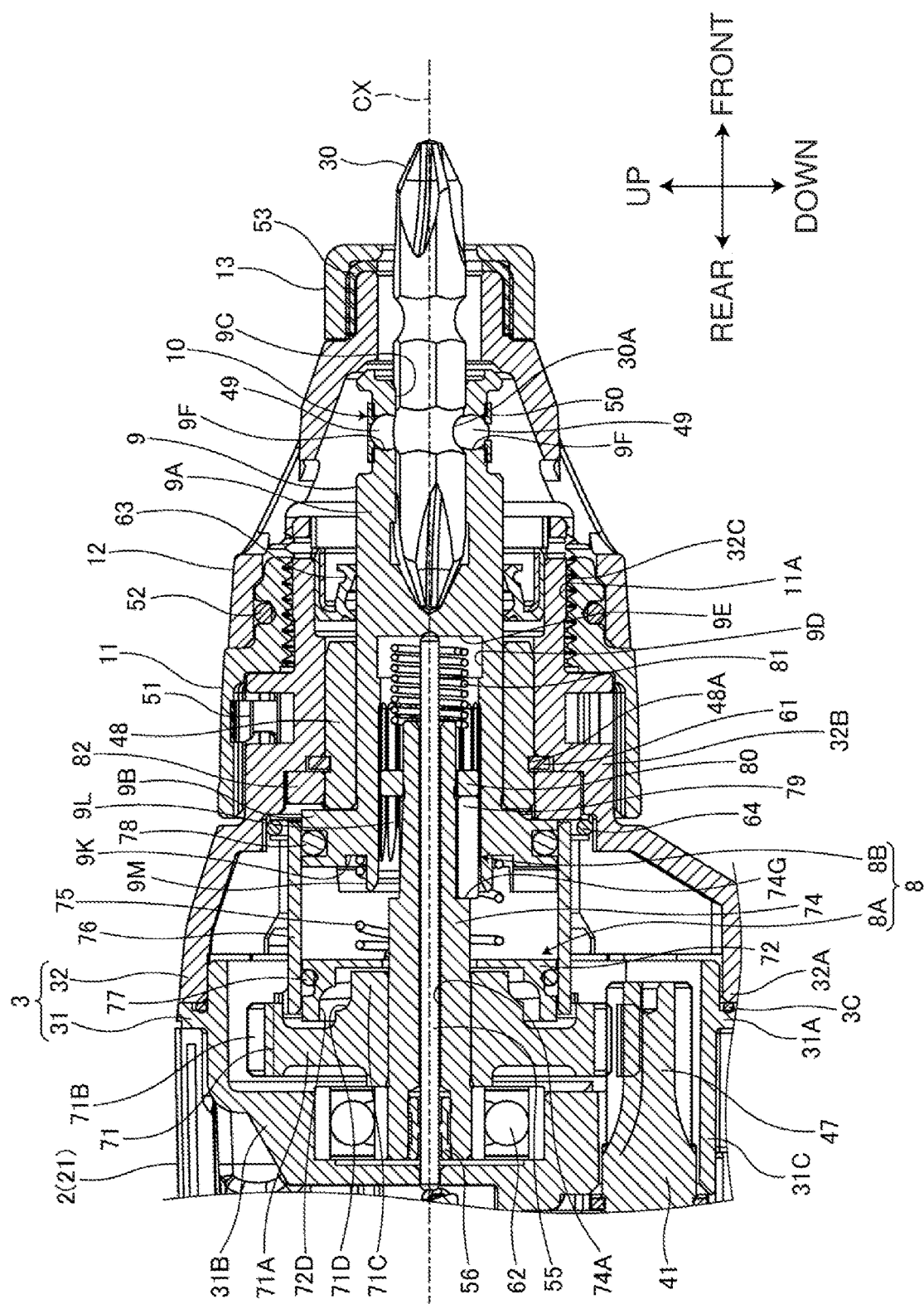
FIG. 5 is a partially enlarged longitudinal sectional view of the screwdriver according to the embodiment.
Figure 6:
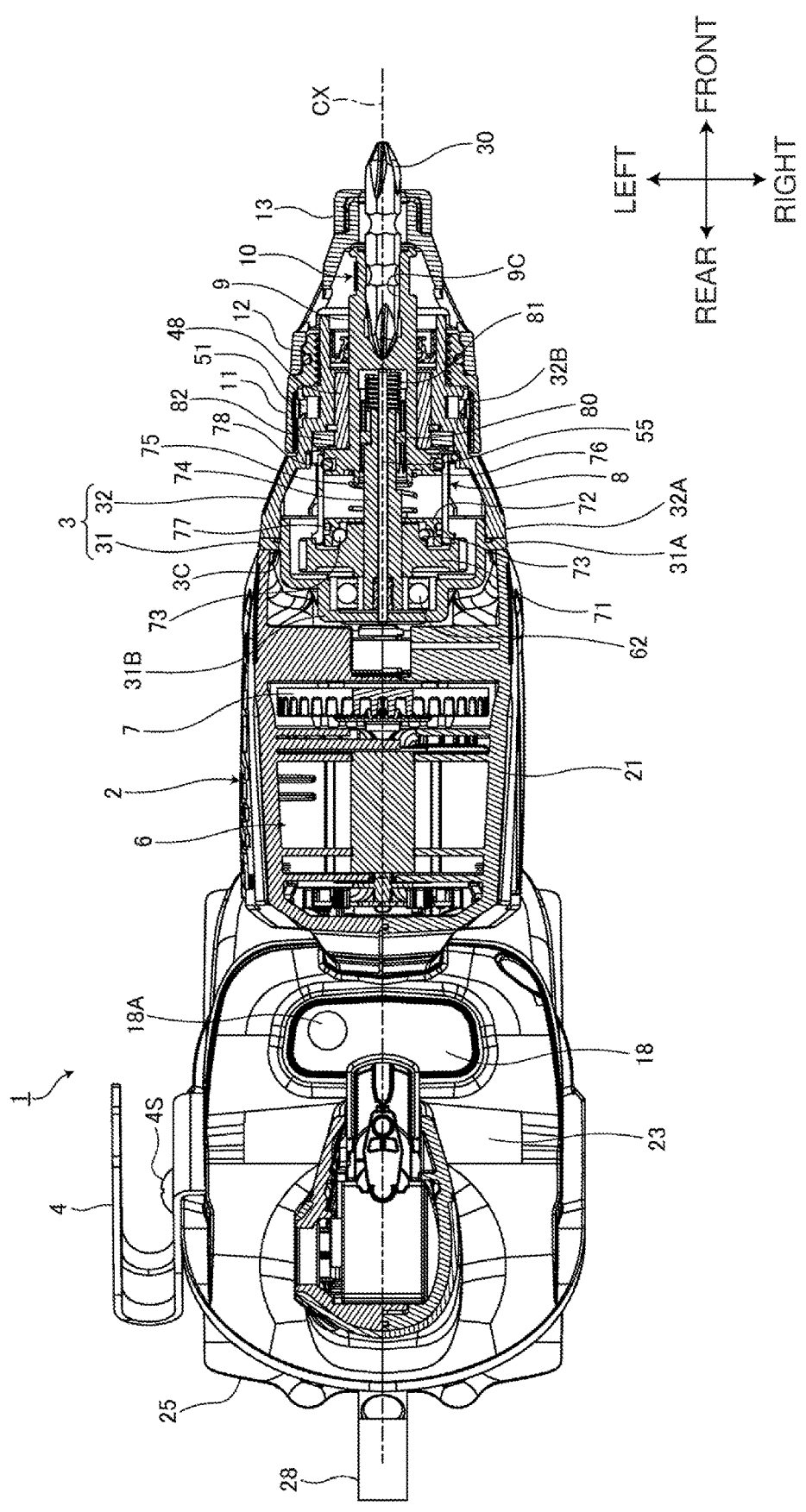
FIG. 6 is a horizontal sectional view of the screwdriver according to the embodiment.
Figure 7:
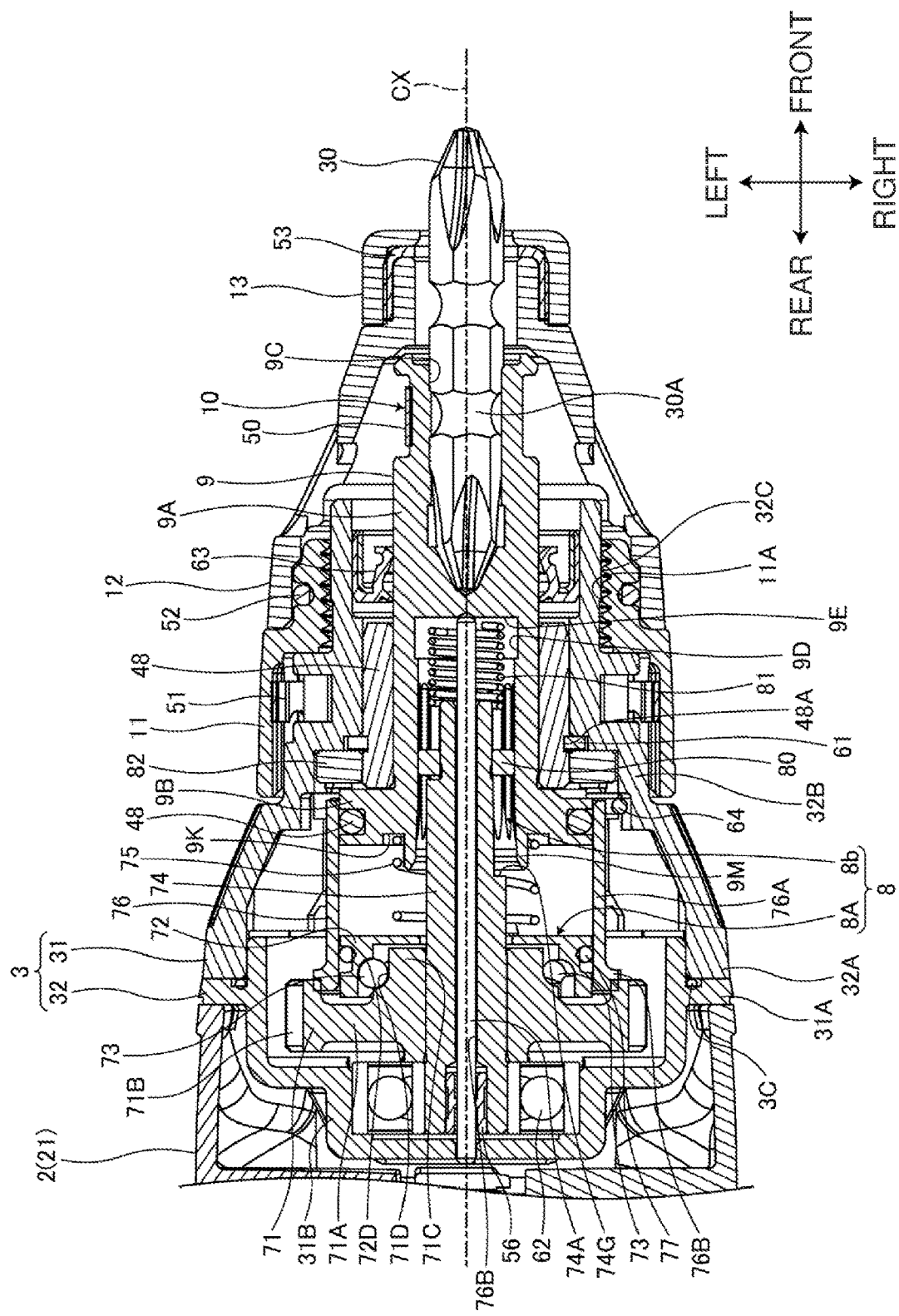
FIG. 7 is a partially enlarged horizontal sectional view of the screwdriver according to the embodiment.

FIG. 1 is a perspective view of a screwdriver 1 according to an embodiment as viewed from the front. FIG. 2 is a perspective view of the screwdriver 1 as viewed from the rear. FIG. 3 is a side view of the screwdriver 1. FIG. 4 is a longitudinal sectional view of the screwdriver 1. FIG. 5 is a partially enlarged longitudinal sectional view of the screwdriver 1. FIG. 6 is a horizontal sectional view of the screwdriver 1. FIG. 7 is a partially enlarged horizontal sectional view of the screwdriver 1.

The screwdriver 1 includes a main housing 2, a gear housing 3, a hook 4, a battery mount 5, a motor 6, a fan 7, a power transmission 8, the spindle 9, a brake member 82, a tool holder 10, a lock ring 11, an adjusting sleeve 12, a rubber cap 13, a trigger lever 14, a lock button 15, a forward-reverse switch lever 16, a light 17, a switch plate 18, a push-drive assembly 19, and a controller 20.

The main housing 2 accommodates at least parts of components of the screwdriver 1. The main housing 2 includes a pair of housing halves. The main housing 2 includes a left housing 2L and a right housing 2R. The right housing 2K is located on the right of the left housing 2L. The left housing 2L and the right housing 2R are fastened together with multiple screws 2S.

The main housing 2 includes a motor compartment 21, a handle 22, a battery holder 23, and a joint 24.

The motor compartment 21 accommodates at least parts of the motor 6 and the power transmission 8. The motor compartment 21 is cylindrical. The motor compartment 21 extends in the front-rear direction.

The handle 22 is grippable by an operator. The handle 22 includes a grip 22A and a joint 22B. The grip 22A extends vertically. The joint 22B extends frontward from an upper portion of the grip 22A. The joint 22B has its front end connecting to the upper rear end of the motor compartment 21.

The battery holder 23 holds a battery pack 25 with the battery mount 5. The battery holder 23 accommodates the controller 20. The grip 22A has its lower end connecting to the rear of the battery holder 23.

The joint 24 connects a lower portion of the motor compartment 21 to the front of the battery holder 23.

The main housing 2 has a loop defined by the rear of the motor compartment 21, the joint 24, the battery holder 23, and the handle 22 connected together.

The motor compartment 21 has inlets 26 and an outlet 27. The inlets 26 are located on the right and the left of the motor compartment 21. The outlet 27 is located in a lower portion of the motor compartment 21. Air outside the main housing 2 flows into an internal space of the main housing 2 through the inlets 26, and flows out of the main housing 2 through the outlet 27.

The gear housing 3 accommodates at least a part of the power transmission 8. The gear housing 3 accommodates at least a part of the spindle 9. The gear housing 3 is located at least partially frontward from the main housing 2.

The gear housing 3 includes a rear housing 31 and a front housing 32. The front housing 32 is located at least partially frontward from the rear housing 31. The rear housing 31 is at least partially received in a front portion of the motor compartment 21. The front housing 32 is located frontward from the motor compartment 21.

The rear housing 31 includes a plate 31A, a recess 31B, and a cylinder 31C. The recess 31B is recessed rearward from an upper portion of the plate 31A. The cylinder 31C protrudes rearward from a lower portion of the plate 31A. The front housing 32 includes a plate 32A and a cylindrical portion 32B. The cylindrical portion 32B protrudes frontward from the plate 32A.

The gear housing 3 is fixed to the front portion of the motor compartment 21. The front portion of the motor compartment 21, the plate 31A in the rear housing 31, and the plate 32A in the front housing 32 are fastened together with three screws 3S. A seal ring 3C is located between the plate 31A and the plate 32A.

The hook 4 can be hooked on a predetermined object. The hook 4 is hooked on, for example, at least a part of the operator's clothing or on the operator's belt. The hook 4 is fastened to the left of the battery holder 23 with a screw 4S. A hand strap 28 is attached to the rear of the battery holder 23. The hand strap 28 is held by the operator.

The battery pack 25 is attached to the battery mount 5 in a detachable manner. The battery mount 5 is located in a lower portion of the battery holder 23. The battery pack 25 serves as a power supply for the screwdriver 1. The battery pack 25 is placed onto the battery mount 5 from the front of the battery holder 23 and is thus attached to the battery mount 5. The battery pack 25 is pulled forward along the battery mount 5 and is detached from the battery mount 5. The battery pack 25 includes a secondary battery. The battery pack 25 in the embodiment includes a rechargeable lithium-ion battery. The battery pack 25 is attached to the battery mount 5 to power the screwdriver 1. The motor 6 is driven by power supplied from the battery pack 25. The controller 20 and the switch plate 18 each operate with power supplied from the battery pack 25.

The motor 6 is a power source for the screwdriver 1. The motor 6 is an electric motor drivable with power supplied from the battery pack 25. The motor 6 is an inner-rotor brushless motor. The motor 6 includes a stator 33 and a rotor 34. The stator 33 is supported by the motor compartment 21. The rotor 34 is located at least partially inward from the stator 33. The rotor 34 rotates relative to the stator 33. The rotor 34 rotates about the rotation axis AX extending in the front-rear direction.

The stator 33 includes a stator core 35, a rear insulator 36R, a front insulator 36F, and multiple coils 37.

The stator core 35 is located radially outward from the rotor 34 about the rotation axis AX. The stator core 35 includes multiple steel plates stacked on one another. The steel plates are metal plates formed from iron as a main component. The stator core 35 is cylindrical. The stator core 35 includes multiple teeth to support the coils 37.

The rear insulator 36R is fixed to the rear of the stator core 35. The front insulator 36F is fixed to the front of the stator core 35. The rear insulator 36R and the front insulator 36F are electrical insulating members formed from a synthetic resin. The rear insulator 36R covers parts of the surfaces of the teeth on the stator core 35. The front insulator 36F covers parts of the surfaces of the teeth on the stator core 35.

The coils 37 are wound around the stator core 35 with the rear insulator 36R and the front insulator 36F in between. The coils 37 surround the teeth on the stator core 35 with the rear insulator 36R and the front insulator 36F in between. The stator core 35 and the coils 37 are electrically insulated from each other with the rear insulator 36R and the front insulator 36F. The coils 37 are connected to one another with a short-circuiting member 38. A current from the battery pack 25 is supplied to the coils 37 through the controller 20, a lead wire (not shown), and a connector 39 fixed to a lower portion of the rear insulator 36R. The connector 39 is fastened to the rear insulator 36R with a screw 39S.

The rotor 34 rotates about the rotation axis AX. The rotor 34 includes a rotor core 40, a rotor shaft 41, and a rotor magnet 42.

The rotor core 40 and the rotor shaft 41 are formed from steel. The rotor shaft 41 is fixed to the rotor core 40. The rotor core 40 is cylindrical. The rotor shaft 41 is located radially inward from the rotor core 40. The rotor shaft 41 includes a front portion protruding frontward from the front end face of the rotor core 40. The rotor shaft 41 includes a rear portion protruding rearward from the rear end face of the rotor core 40.

The rotor magnet 42 is fixed to the rotor core 40. The rotor magnet 42 is located inside the rotor core 40. The rotor magnet 42 is received in a magnet slot in the rotor core 40.

A sleeve 29 faces the front end face of the rotor core 40. The sleeve 29 is fixed to the rotor core 40 and the rotor shaft 41. The sleeve 29 adjusts the rotational balance of the rotor 34.

A rotation sensor board 43 is attached to the rear insulator 36R. The rotation sensor board 43 is fastened to the rear insulator 36R with screws 43S. The rotation sensor board 43 includes an annular circuit board and a magnetic sensor supported on the circuit board. The rotation sensor board 43 at least partially faces the rotor magnet 42. The magnetic sensor detects the position of the rotor magnet 42 to detect the position of the rotor 34 in the rotation direction. The magnetic sensor transmits a detection signal to the controller 20 through a lead wire (not shown).

The rotor shaft 41 has the rear end rotatably supported by a rotor bearing 44. The rotor shaft 41 includes the front portion rotatably supported by a rotor bearing 45. The rotor bearings 44 and 45 are ball bearings. The rotor bearing 44 is held in a recess 21A on the rear inner surface of the motor compartment 21. The rotor bearing 44 includes an inner ring with its front end in contact with a step on the rear portion of the rotor shaft 41. This restricts the rotor bearing 44 from moving relative to the rotor shaft 41 in the front-rear direction. The rotor bearing 45 is held by the cylinder 31C in the rear housing 31. The rotor bearing 45 includes an inner ring with its rear end in contact with a step on the front portion of the rotor shaft 41. A circlip 46 is located in front of the rotor bearing 45. The circlip 46 is in contact with the front end of the inner ring in the rotor bearing 45. This restricts the rotor bearing 45 from moving relative to the rotor shaft 41 in the front-rear direction. The rotor shaft 41 has its front end extending into the front housing 32 through an opening at the front end of the cylinder 31C.

A pinion gear 47 is fixed to the front end of the rotor shaft 41. The pinion gear 47 is connected to at least a part of the power transmission 8. The rotor shaft 41 is connected to the power transmission 8 with the pinion gear 47.

The fan 7 generates an airflow for cooling the motor 6. The fan 7 is located frontward from the stator 33. The fan 7 is between the rotor bearing 45 and the stator 33. The fan 7 is fixed to the rotor shaft 41 between the rotor bearing 45 and the stator 33. The main housing 2 includes a fan case 2A surrounding the fan 7. The fan 7 rotates as the rotor 34 rotates. As the rotor shaft 41 rotates, the fan 7 rotates together with the rotor shaft 41. Air outside the main housing 2 thus flows into the internal space of the main housing 2 through the inlets 26 and flows through the internal space of the main housing 2 to cool the motor 6. As the fan 7 rotates, the air passing through the main housing 2 flows out of the main housing 2 through the outlet 27.

The power transmission 8 transmits a rotational force from the motor 6 to the spindle 9. The power transmission 8 rotates the spindle 9 at a lower rotational speed than the rotor shaft 41. The power transmission 8 in the embodiment includes a clutch assembly 8A and a spindle locking assembly 8B. During forward rotation of the motor 6, the clutch assembly 8A transmits a rotational force from the motor 6 to the spindle 9. During reverse rotation of the motor 6, the spindle locking assembly 8B transmits a rotational force from the motor 6 to the spindle 9.

Figure 8:
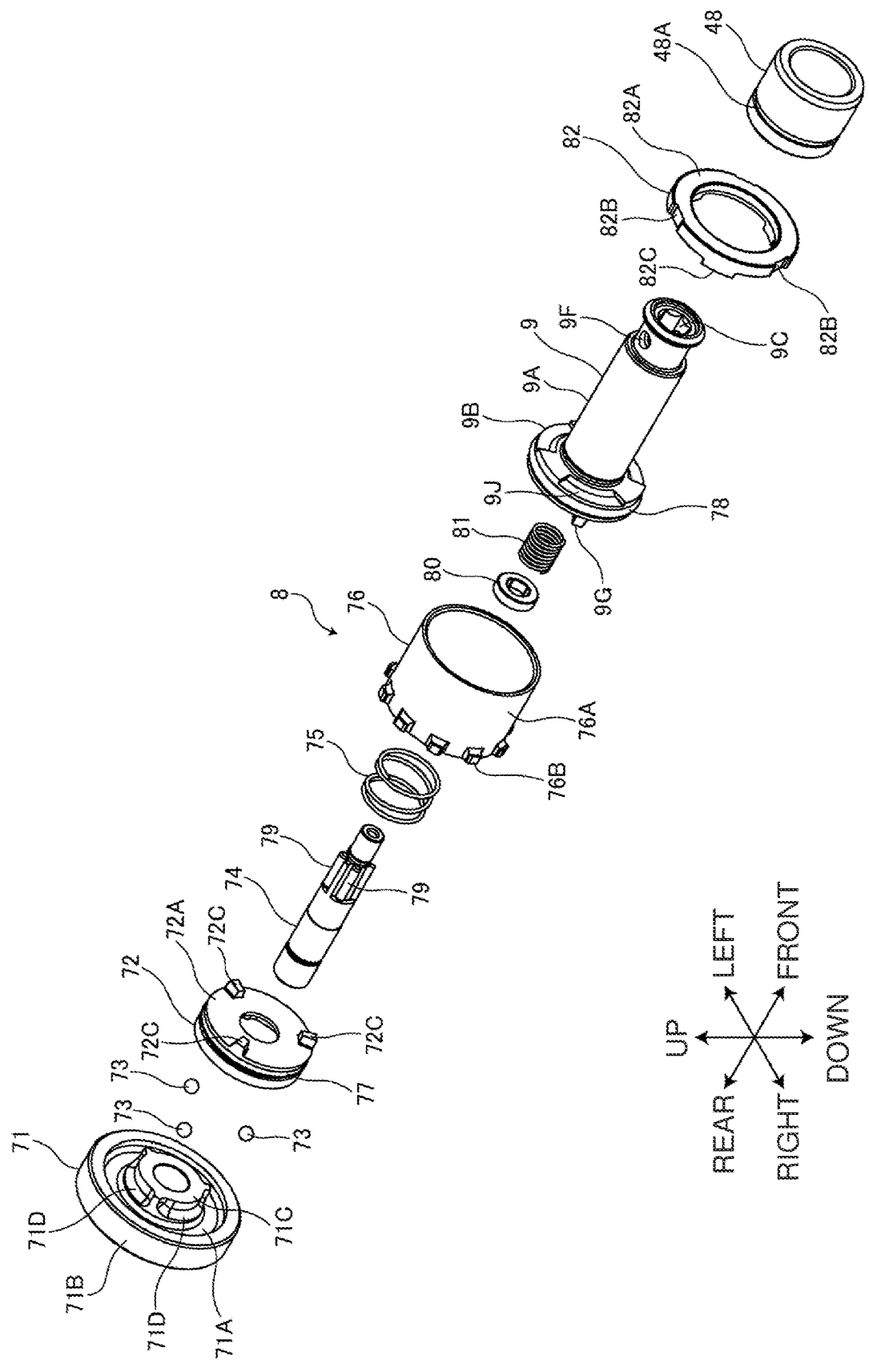
FIG. 8 is an exploded perspective view of a power transmission in the embodiment as viewed from the front.
Figure 9:
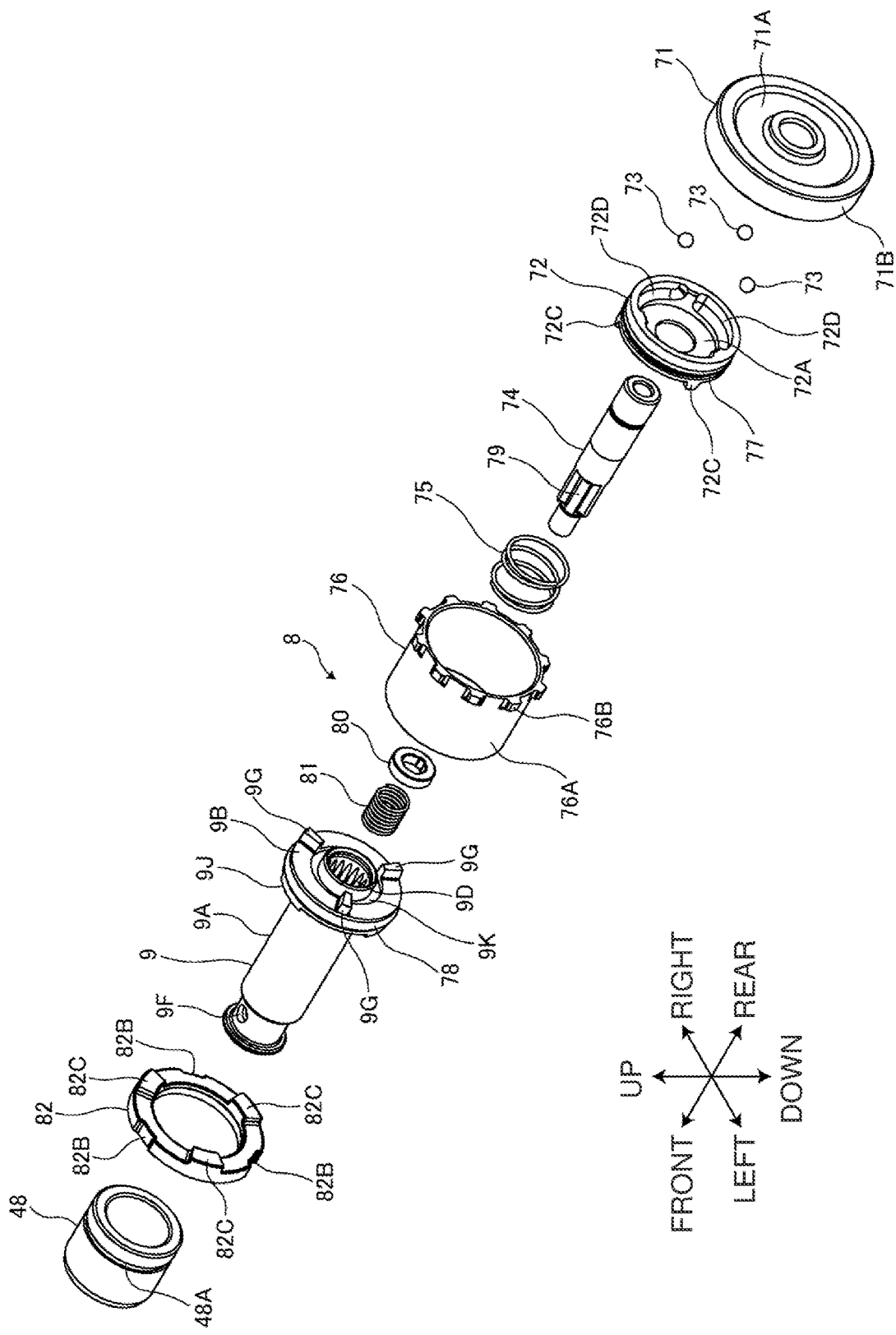
FIG. 9 is an exploded perspective view of the power transmission in the embodiment as viewed from the rear.
Figure 10:
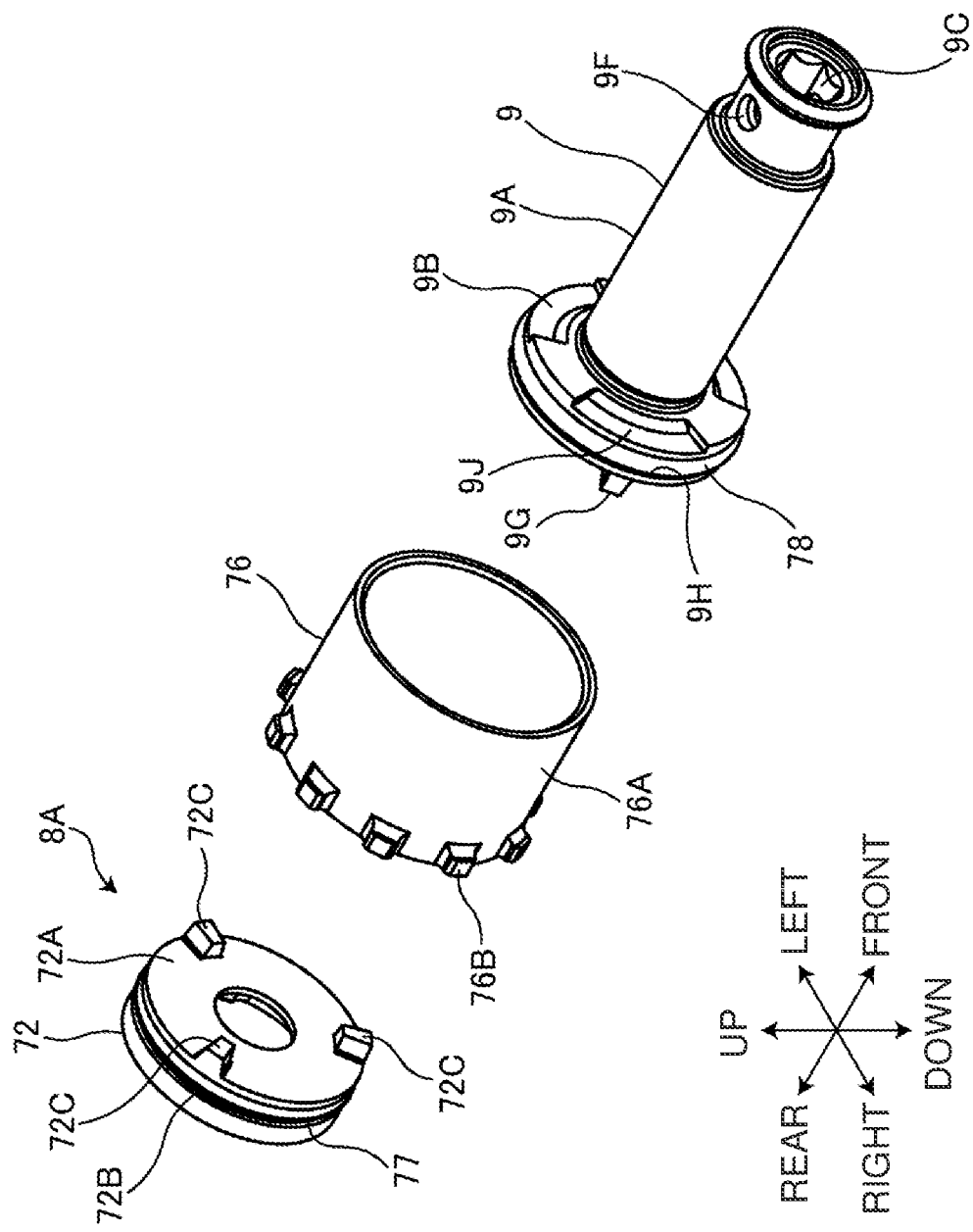
FIG. 10 is an exploded perspective view of a clutch assembly and a cam sleeve in the embodiment as viewed from the front.
Figure 11:
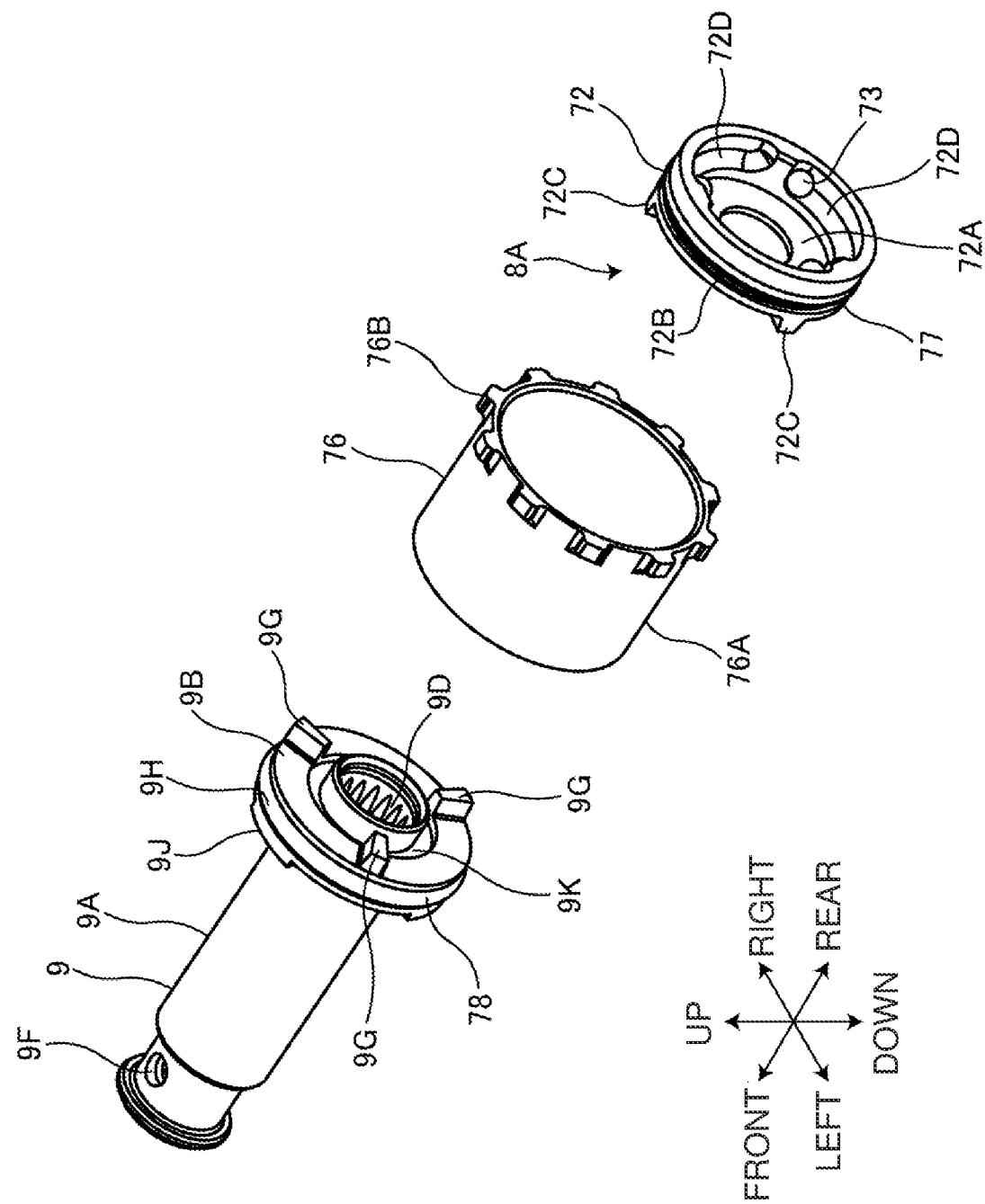
FIG. 11 is an exploded perspective view of the clutch assembly and the cam sleeve in the embodiment as viewed from the rear.
Figure 12:
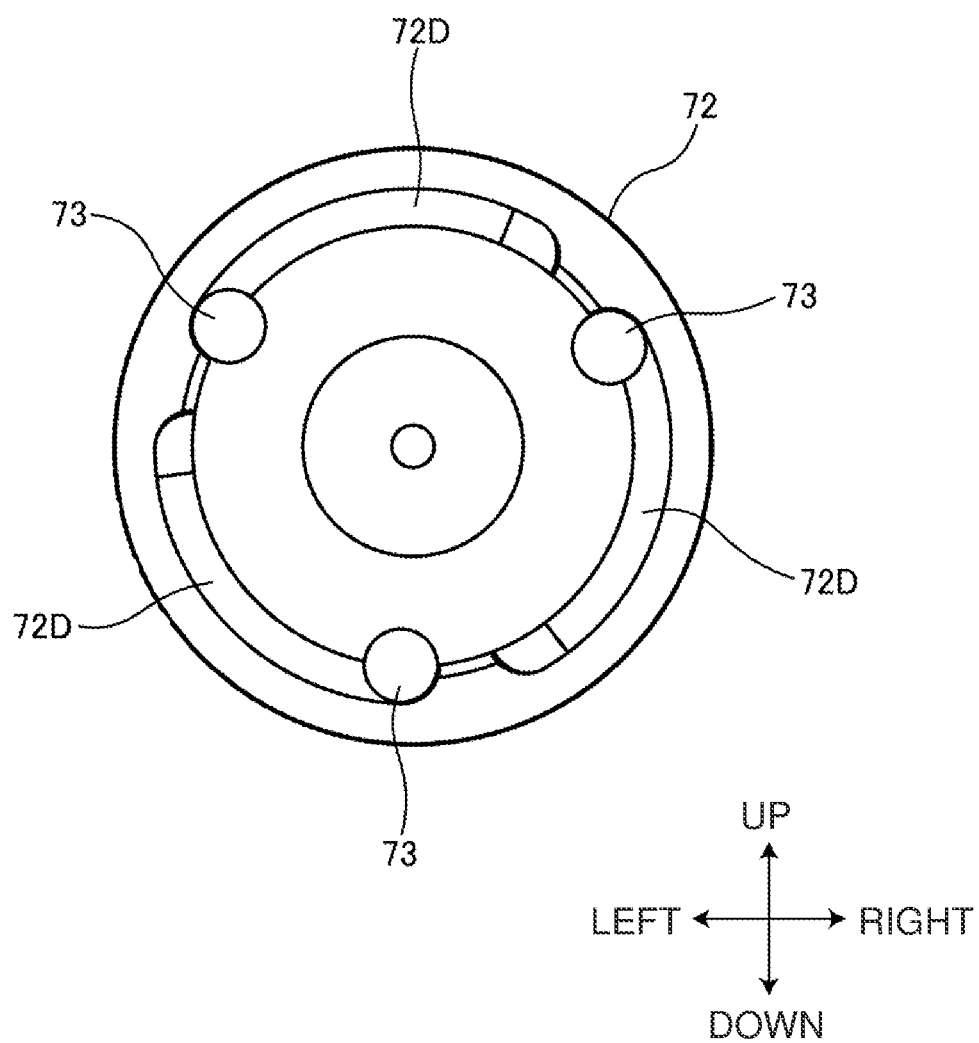
FIG. 12 is a rear view of a clutch cam in the embodiment.
Figure 13:
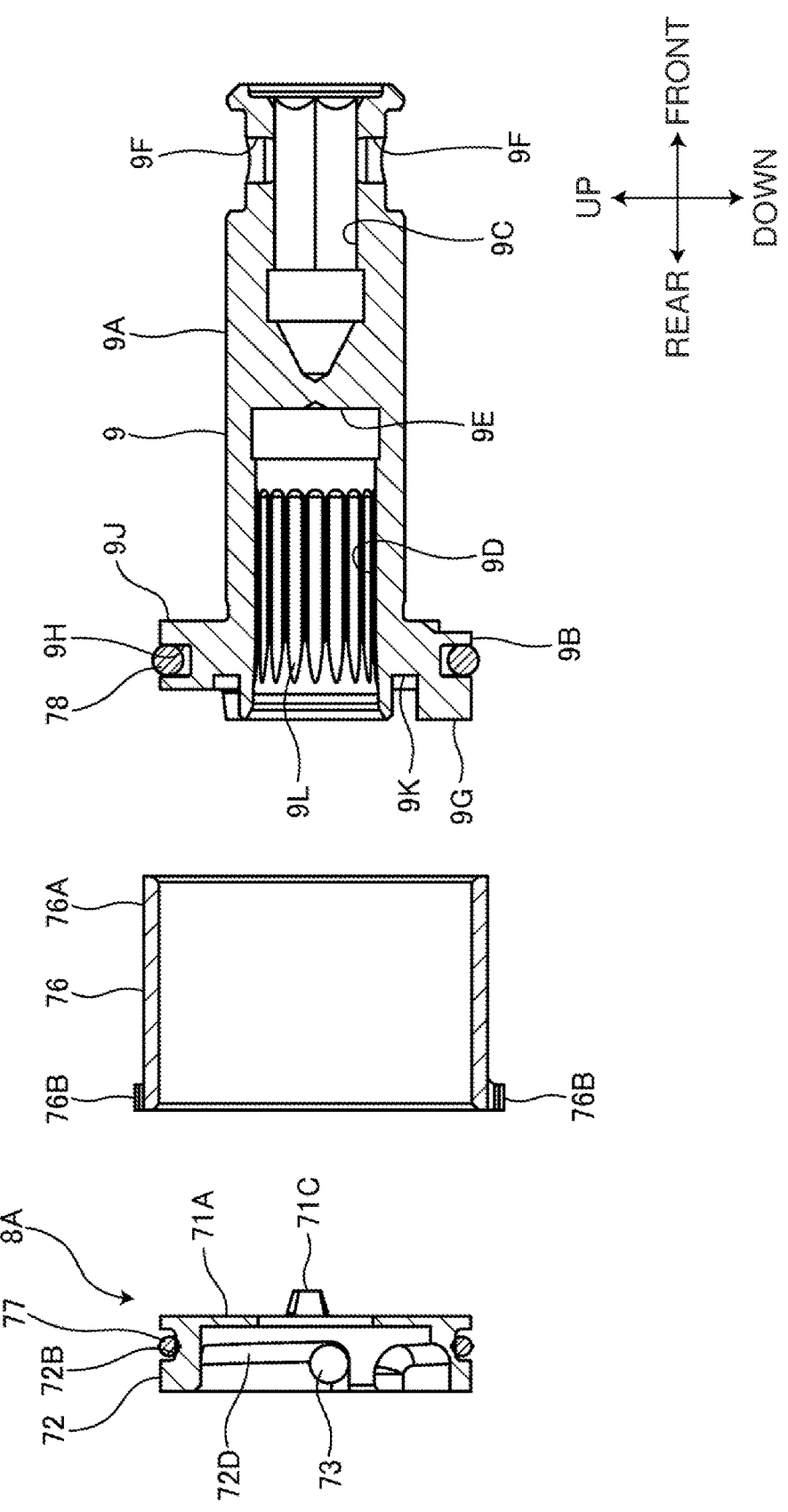
FIG. 13 is a longitudinal sectional view of the clutch assembly and the cam sleeve in the embodiment.
Figure 14:
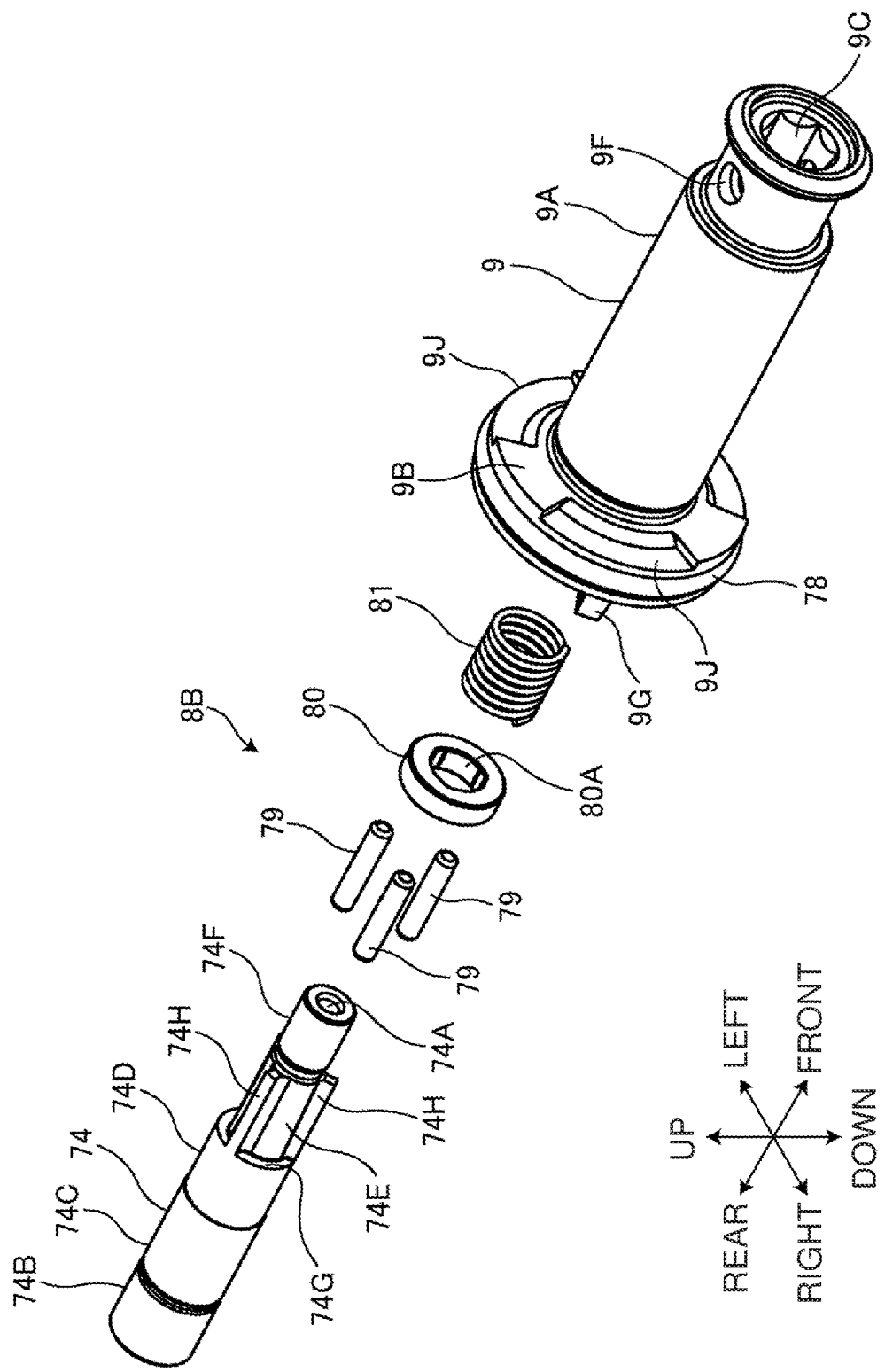
FIG. 14 is an exploded perspective view of a spindle locking assembly in the embodiment as viewed from the front.
Figure 15:
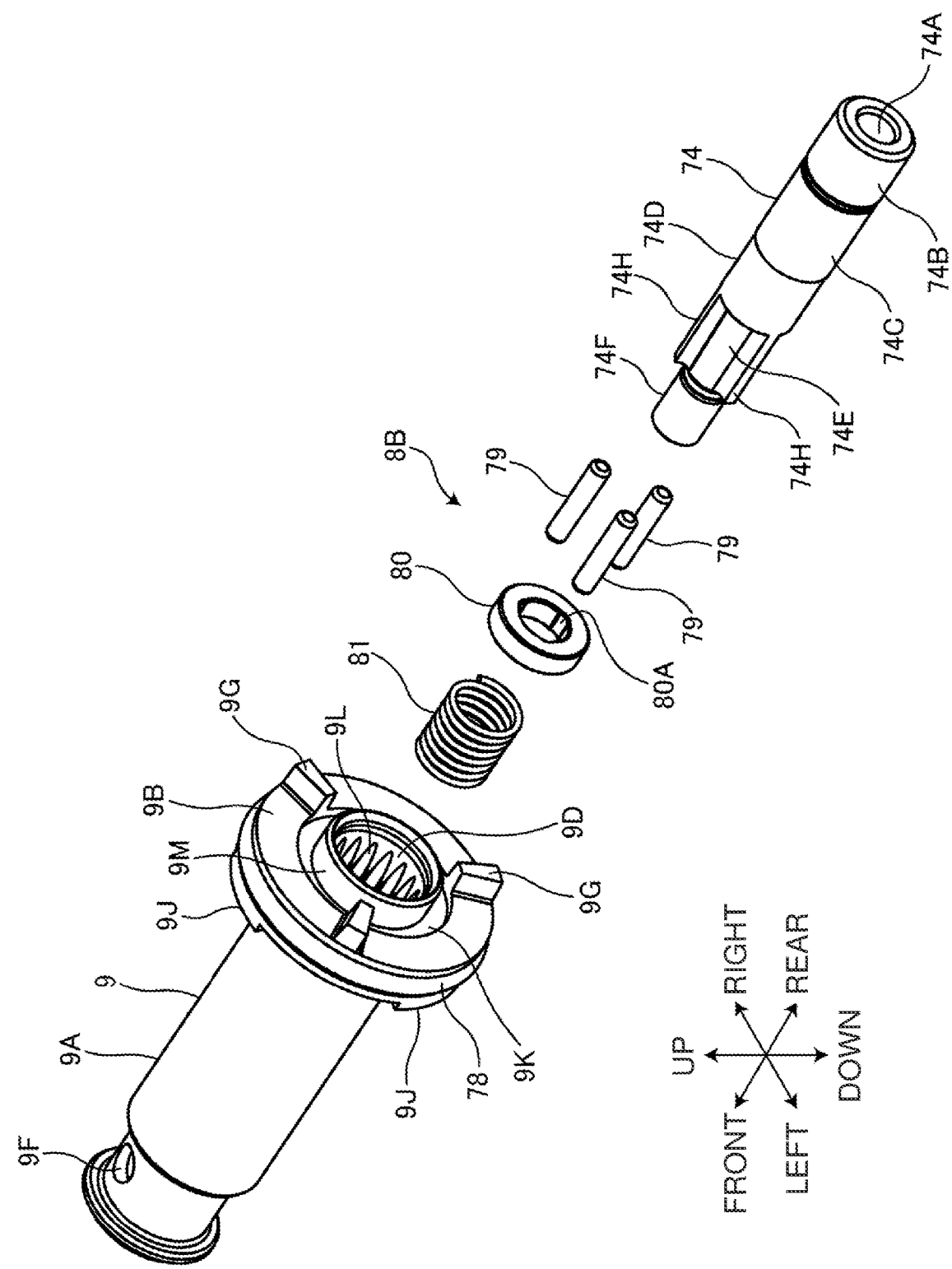
FIG. 15 is an exploded perspective view of the spindle locking assembly in the embodiment as viewed from the rear.
Figure 16:
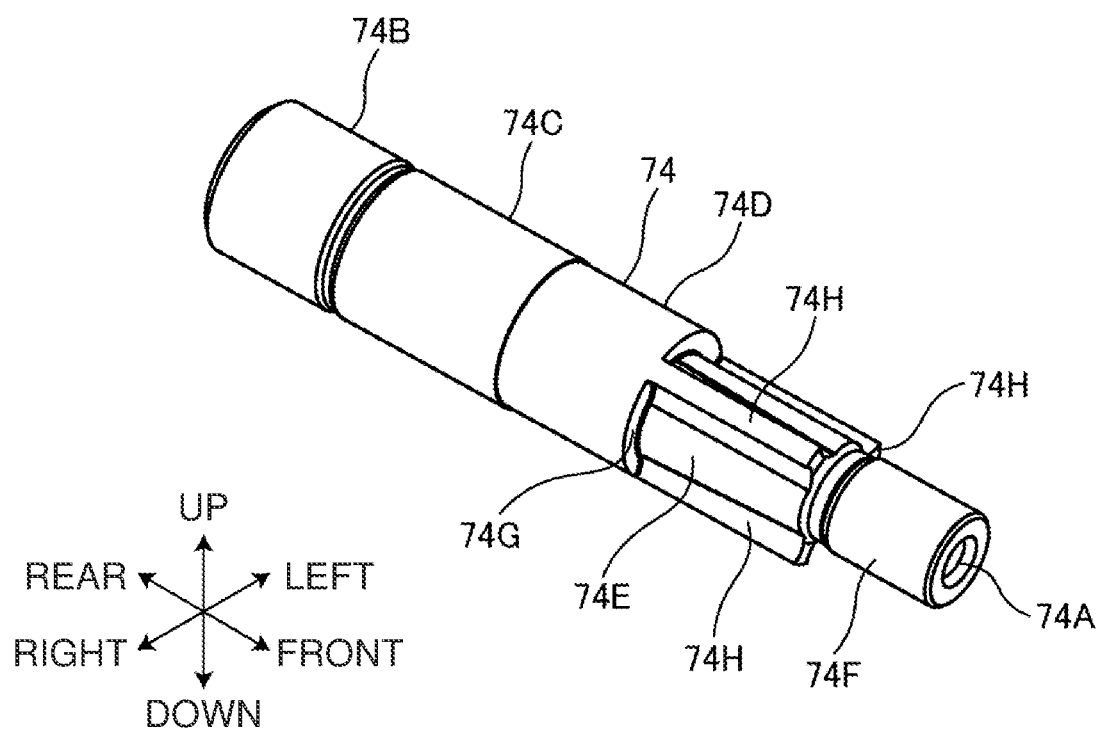
FIG. 16 is a perspective view of a countershaft in the embodiment as viewed from the front.
Figure 17:
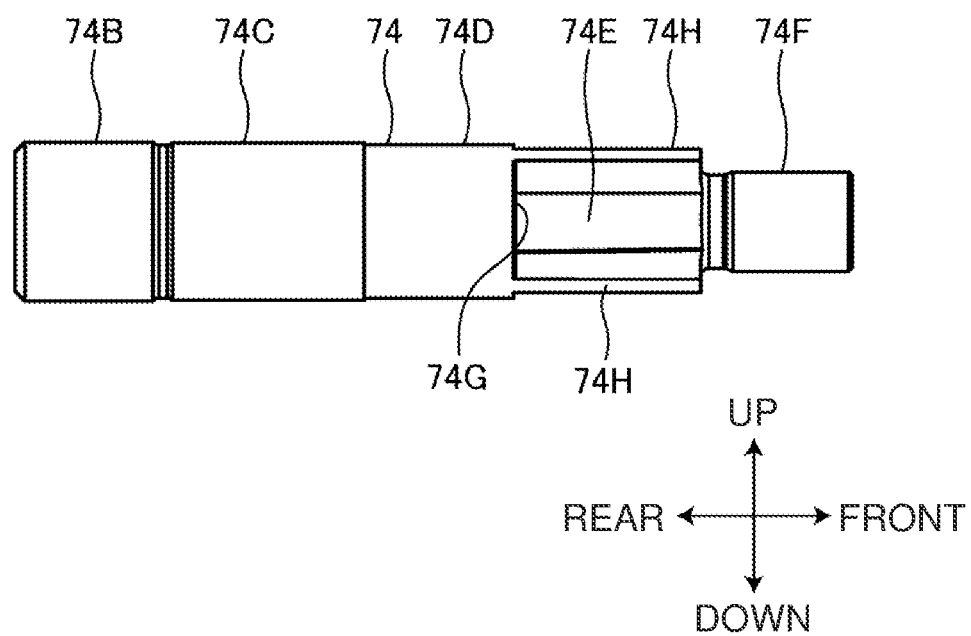
FIG. 17 is a side view of the countershaft in the embodiment.
Figure 18:
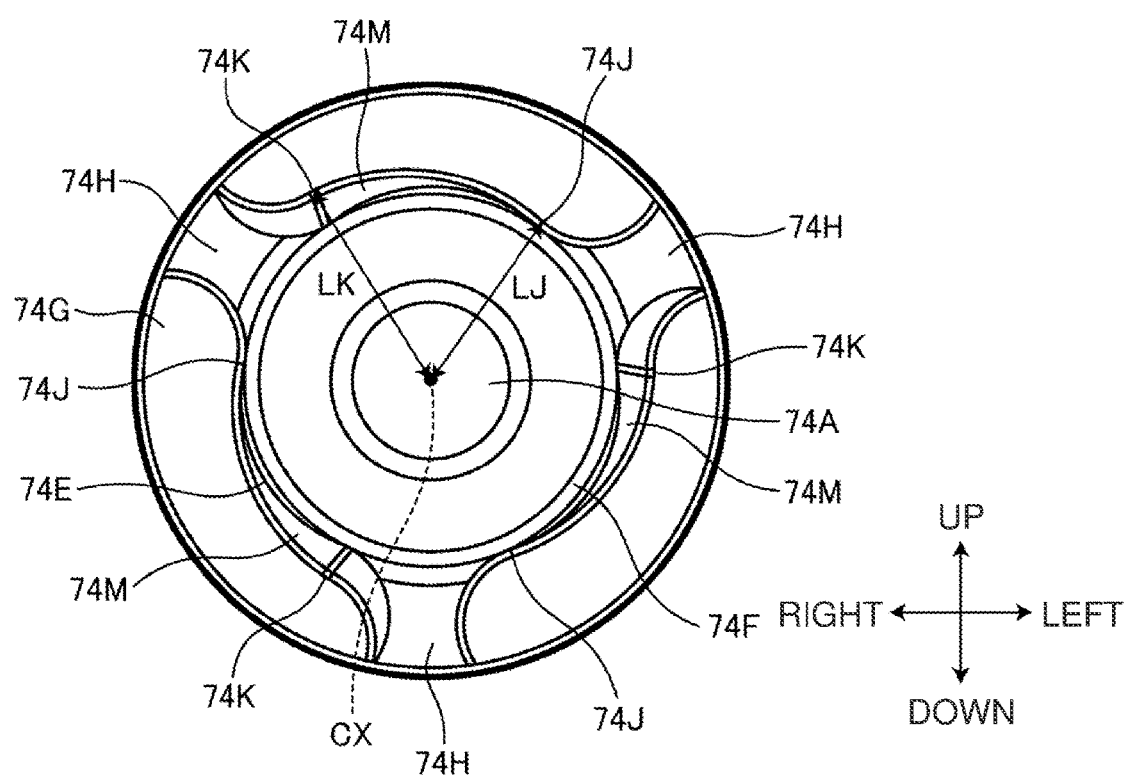
FIG. 18 is a front view of the countershaft in the embodiment.

FIG. 8 is an exploded perspective view of the power transmission 8 in the embodiment as viewed from the front. FIG. 9 is an exploded perspective view of the power transmission 8 as viewed from the rear. FIG. 10 is an exploded perspective view of the clutch assembly 8A and a sleeve 76 as viewed from the front. FIG. 11 is an exploded perspective view of the clutch assembly 8A and the sleeve 76 as viewed from the rear. FIG. 12 is a rear view of a clutch cam 72. FIG. 13 is a longitudinal sectional view of the clutch assembly 8A and the sleeve 76. FIG. 14 is an exploded perspective view of the spindle locking assembly 8B as viewed from the front. FIG. 15 is an exploded perspective view of the spindle locking assembly 8B as viewed from the rear. FIG. 16 is a perspective view of a countershaft 74 as viewed from the front. FIG. 17 is a side view of the countershaft 74. FIG. 18 is a front view of the countershaft 74.

The power transmission 8 includes a drive gear 71, the clutch can 72, multiple (three in the present embodiment) balls 73, the countershaft 74, a compression spring 75, the sleeve 76, a rear O-ring 77, a front O-ring 78, lock pins 79, a sleeve 80, and a compression spring 81.

The clutch assembly 8A includes the clutch cam 72 and the compression spring 75. The clutch cam 72 is connected to the drive gear 71 with the balls 73 in between. The compression spring 75 urges the spindle 9 forward. The drive gear 71, the clutch cam 72, and the compression spring 75 are located in the gear housing 3.

The spindle locking assembly 8B includes the countershaft 74, multiple (three in the present embodiment) lock pins 79, the sleeve 80, and the compression spring 81. The countershaft 74 is connected to the drive gear 71. The lock pins 79 surround the countershaft 74. The sleeve 80 is in contact with the front ends of the lock pins 79. The compression spring 81 urges the lock pins 79 backward through the sleeve 80. The countershaft 74, the lock pins 79, the sleeve 80, and the compression spring 81 are located in the gear housing 3.

The drive gear 71 meshes with the pinion gear 47. The drive gear 71 is a helical gear. The drive gear 71 is located above the pinion gear 47. The pinion gear 47 rotates about the rotation axis AX as the rotor shaft 41 in the motor 6 rotates. This causes the drive gear 71 to rotate about the rotation axis CX. The drive gear 71 includes a ring 71A, a gear 71B, and a cylindrical portion 71C. The gear 71B is located on the outer circumference of the ring 71A and meshes with the pinion gear 47. The cylindrical portion 71C protrudes frontward from the front surface of the ring 71A and is connected to the clutch cam 72. The drive gear 71 is accommodated in the rear housing 31.

The clutch cam 72 is connected to the drive gear 71 with the balls 73 in between. The drive gear 71 is located at least partially rearward from the clutch cam 72. The clutch cam 72 is supported by the drive gear 71 with the balls 73 in between. The drive gear 71 supports the clutch cam 72 from the rear of the clutch cam 72. As the drive gear 71 rotates, the clutch cam 72 rotates about the rotation axis CX. The clutch cam 72 includes a cam ring 72A, a ring groove 72B, drive cams 72C, and cam ball grooves 72D. The cam ring 72A surrounds the rotation axis CX. The ring groove 72B is located on the outer circumference of the cam ring 72A. The drive cams 72C protrude frontward from the front surface of the cam ring 72A. The cam ball grooves 72D are located on the rear surface of the cam ring 72A to receive the balls 73.

Three cam ball grooves 72D are located at the rear of the cam ring 72A. The three cam ball grooves 72D are arc-shaped in a plane orthogonal to the rotation axis CX. As shown in FIG. 13, the cam ball grooves 72D are at least partially inclined in the front-rear direction. The cam ball grooves 72D surround the rotation axis CX. Each cam ball groove 72D receives one ball 73.

The cylindrical portion 71C of the drive gear 71 has gear ball grooves 71D to receive the balls 73. Three gear ball grooves 71D are located on the outer circumferential surface of the cylindrical portion 71C. The three gear ball grooves 71D are arc-shaped in a plane orthogonal to the rotation axis CX. The gear ball grooves 71D surround the rotation axis CX. Each gear ball groove 71D receives one ball 73.

The countershaft 74 is fixed to the drive gear 71. The countershaft 74 includes its rear portion placed through an opening at the center of the drive gear 71. The countershaft 74 has its rear end rotatably supported by a shaft bearing 62. The shaft bearing 62 is a ball bearing. The shaft bearing 62 is held in the recess 31B on the rear housing 31. The clutch cam 72 surrounds the countershaft 74. The countershaft 74 has its front end received in a reception hole 9D in the spindle 9.

The countershaft 74 has a through-hole 74A to receive a rod 55. The countershaft 74 includes a bearing receiver 74B, a gear fixing portion 74C, an intermediate portion 74D, a pin support 74E, and a sleeve support 74F. The bearing receiver 74B is held by the shaft bearing 62. The drive gear 71 is fixed to the gear fixing portion 74C. The intermediate portion 74D is located inside the compression spring 75. The pin support 74E supports the lock pins 79. The sleeve support 74F supports the sleeve 80. The gear fixing portion 74C is located frontward from the bearing receiver 74B. The intermediate portion 74D is located frontward from the gear fixing portion 74C. The pin support 74E is located frontward from the intermediate portion 74D. The sleeve support 74F is located frontward from the pin support 74E. The pin support 74E has a smaller outer diameter than the intermediate portion 74D.

Steps are defined at the boundary between the intermediate portion 74D and the pin support 74E. Stop surfaces 74G are at the boundary between the intermediate portion 74D and the pin support 74E. The stop surfaces 74G are at the rear end of the pin support 74E. The stop surfaces 74G face frontward. The lock pins 79 are in contact with the outer circumferential surface of the pin support 74E. The lock pins 79 have their rear end faces that face the stop surfaces 74G.

The pin support 74E includes protrusions 74H. The protrusions 74H protrude radially outward from the outer circumferential surface of the pin support 74E. The protrusions 74H are elongated in the front-rear direction. Multiple (three in the present embodiment) protrusions 74H are arranged at circumferentially equal intervals. Each lock pin 79 is located between a pair of the protrusions 74H adjacent to each other.

As shown in FIG. 18, a ridge 74M is located between adjacent protrusions 74H in each pair on the outer circumferential surface of the pin support 74E. The ridges 74M are located on the outer circumferential surface of a rear portion of the pin support 74E. A smaller-diameter portion 74J and a larger-diameter portion 74K are located between adjacent protrusions 74H in each pair on the pin support 74E. Between adjacent protrusions 74H in each pair, a radial distance LK from the rotation axis CX to the outer circumferential surface of the larger-diameter portion 74K is greater than a radial distance LJ from the rotation axis CX to the outer circumferential surface of the smaller-diameter portion 74J. The distance LK is the radius of the pin support 74E on the larger-diameter portion 74K. The distance LJ is the radius of the pin support 74E on the smaller-diameter portion 74J. The radius of the pin support 74E gradually increases from the smaller-diameter portion 74J toward the larger-diameter portion 74K. The lock pin 79 on the larger-diameter portion 74K is radially outward from the lock pin 79 on the smaller-diameter portion 74J. The lock pin 79 moves radially outward as moving in the circumferential direction from the smaller-diameter portion 74J to the larger-diameter portion 74K.

The compression spring 75 surrounds the countershaft 74. The compression spring 75 is located radially inward from the sleeve 76. The compression spring 75 has its rear end in contact with the front surface of the clutch cam 72. The compression spring 75 has its front end in contact with the rear surface of the spindle 9. The spindle 9 in the embodiment has an annular groove 9K on the rear surface. The front end of the compression spring 75 is received in the groove 9K. The compression spring 75 urges the clutch cam 72 backward. The compression spring 75 urges the spindle 9 forward.

The sleeve 76 surrounds the countershaft 74. The sleeve 76 surrounds the cam ring 72A in the clutch cam 72 and a flange 9B on the spindle 9. The sleeve 76 is supported by the cam ring 72A and the flange 9B. The sleeve 76 includes a cylindrical portion 76A and stoppers 76B. The stoppers 76B protrude radially outward from the rear end of the outer circumferential surface of the cylindrical portion 76A. The cylindrical portion 76A surrounds the cam ring 72A and the flange 9B. The stoppers 76B are in contact with the front surface of the gear 71B in the drive gear 71. This restricts the sleeve 76 from moving backward relative to the drive gear 71. As shown in FIGS. 5 and 7, an O-ring 64 surrounds the front end of the sleeve 76.

The rear O-ring 77 is attached to the clutch cam 72. The rear O-ring 77 is received in the ring groove 72B on the outer circumference of the cam ring 72A.

The front O-ring 78 is attached to the spindle 9. The front O-ring 78 is received in the ring groove 9H on the outer circumference of the flange 9B.

The rear O-ring 77 and the front O-ring 78 are in contact with the sleeve 76. The rear O-ring 77 is in contact with the inner circumferential surface of a rear portion of the sleeve 76. The front O-ring 78 is in contact with the inner circumferential surface of a front portion of the sleeve 76.

The lock pins 79 are held by the countershaft 74. Three lock pins 79 surround the countershaft 74.

The sleeve 80 is located in front of the lock pins 79 in the reception hole 9D. The sleeve 80 has its rear surface in contact with the front end faces of the lock pins 79. The sleeve 80 serves as a centering member for the spindle 9 moving in the front-rear direction relative to the countershaft 74. The sleeve 80 serves as a slide bearing to support the countershaft 74. The sleeve 80 has recesses 80A for supplying grease on its inner circumferential surface.

In the reception hole 9D, the compression spring 81 is located between the front surface of the sleeve 80 and a support surface 9E of the spindle 9. The compression spring 81 has its front end connected to the support surface 9E defining a front portion of the reception hole 9D. The compression spring 81 has its rear end connected to the front surface of the sleeve 80. The compression spring 81 urges the lock pins 79 backward to press the rear end faces of the lock pins 79 against the stop surfaces 74G.

The spindle 9 rotates with a rotational force from the motor 6. The spindle 9 is located at least partially frontward from the power transmission 8. The spindle 9 is located frontward from the clutch cam 72. The spindle 9 rotates about the rotation axis CX. The rotation axis AX of the motor 6 is different from the rotation axis CX of the spindle 9. The rotation axis AX and the rotation axis CX are parallel to each other. The spindle 9 rotates under a rotational force from the rotor 34 transmitted by the power transmission 8. The spindle 9 holds a driver bit 30 as a tip tool and rotates together with the driver bit 30.

Figure 19:
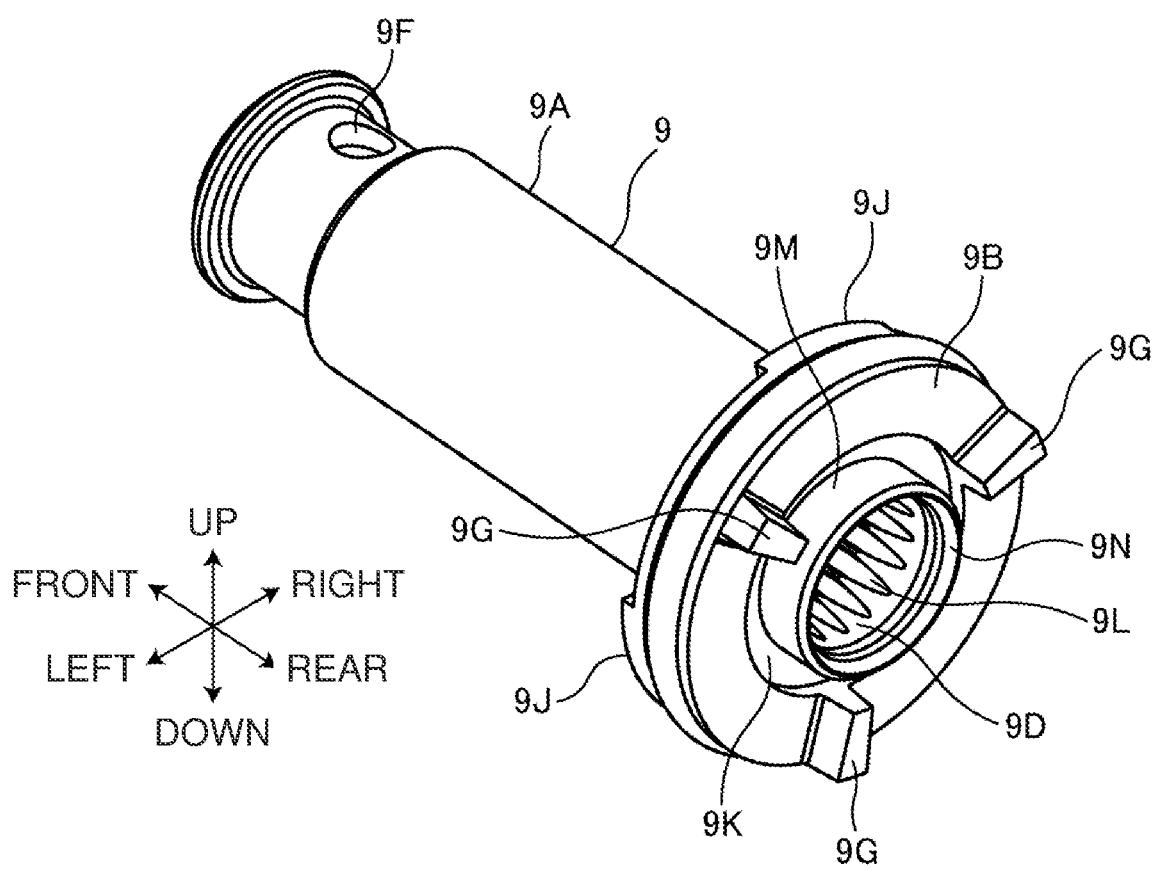
FIG. 19 is a perspective view of a spindle in the embodiment as viewed from the rear.
Figure 20:
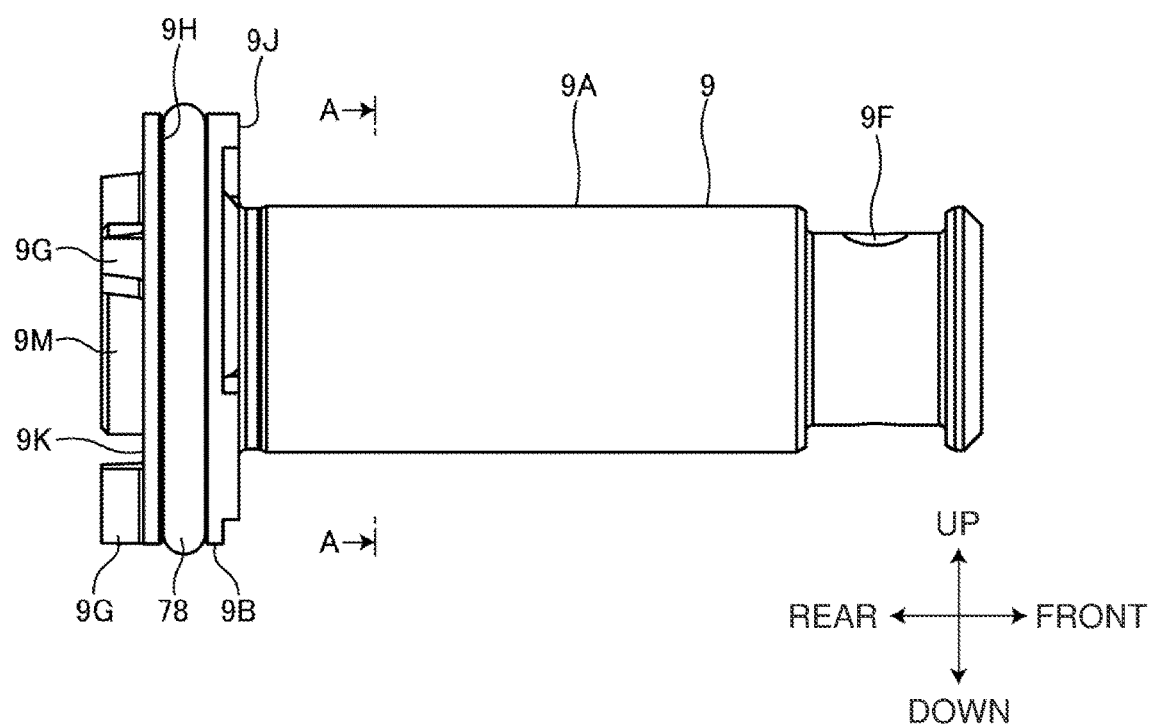
FIG. 20 is a side view of the spindle in the embodiment.
Figure 21:
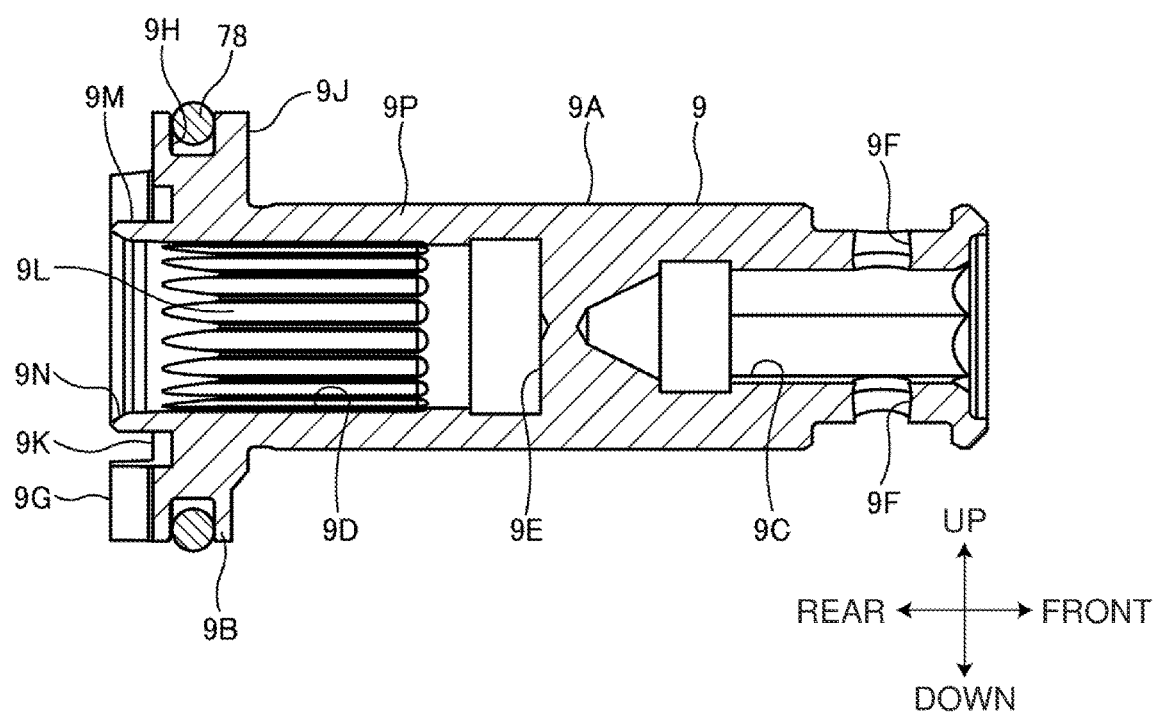
FIG. 21 is a longitudinal sectional view of the spindle in the embodiment.
Figure 22:
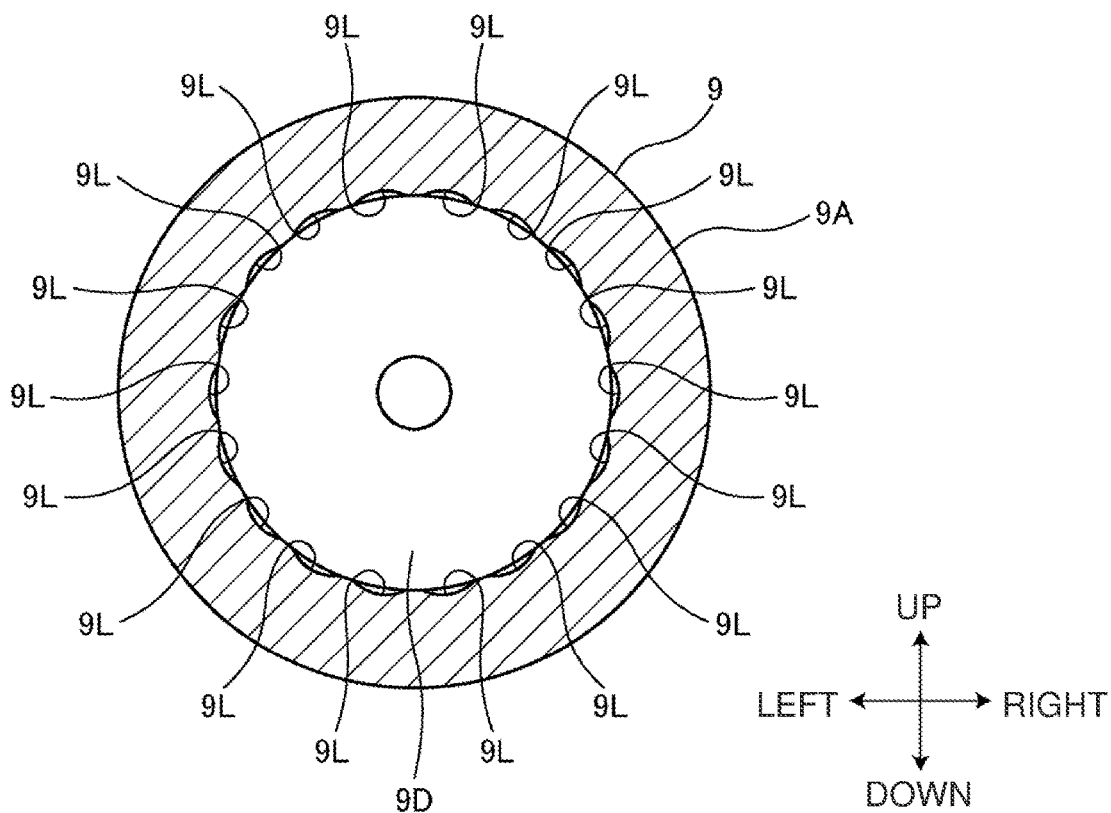
FIG. 22 is a sectional view of the spindle in the embodiment.

FIG. 19 is a perspective view of the spindle 9 in the embodiment as viewed from the rear. FIG. 20 is a side view of the spindle 9. FIG. 21 is a longitudinal sectional view of the spindle 9. FIG. 22 is a sectional view of the spindle 9, taken along line A-A as viewed in the direction indicated by arrows in FIG. 20.

The spindle 9 includes a rod 9A, the flange 9B, a bit holding hole 9C, and the reception hole 9). The rod 9A extends in the front-rear direction. The flange 9B is located at the rear of the rod 9A. The flange 9B is located at the rear end of the rod 9A. The flange 9B protrudes radially outward from the rear end of the rod 9A. The bit holding hole 9C extends rearward from the front end face of the rod 9A. The driver bit 30 is attached to the rod 9A. The driver bit 30 is placed into the bit holding hole 9C from the front of the bit holding hole 9C, The bit holding hole 9C has a hexagonal cross section in a direction orthogonal to the rotation axis CX. The reception hole 9D extends frontward from the rear end face of the spindle 9. The support surface 9E is at the front end of the reception hole 9D. The support surface 9E faces rearward. The reception hole 9D defines a cylindrical portion 9P at the rear of the spindle 9. An oil seal 63 surrounds the rod 9A. The oil seal 63 is held on the cylindrical portion 32B of the front housing 32.

The spindle 9 is rotatably supported by a spindle bearing 48. The spindle bearing 48 is a slide bearing. The spindle bearing 48 is held on the front housing 32. The spindle bearing 48 has, on its outer circumferential surface, a groove 48A to receive a circlip 61. The circlip 61 is at least partially held on the front housing 32. The circlip 61 restricts the spindle bearing 48 from moving relative to the front housing 32 in the front-rear direction. The spindle 9 is rotatably supported by the spindle bearing 48, and is supported in a manner movable relative to the front housing 32 in the front-rear direction. The spindle 9 is supported by the gear housing 3 with the spindle bearing 48 in between in a manner movable in the front-rear direction. The spindle 9 is movable in the front-rear direction between an advanced position and a retracted position. The retracted position is rearward from the advanced position.

The spindle 9 includes follower cams 9G. The follower cams 9G face the drive cams 72C on the clutch cam 72. The follower cams 9G are located on the rear surface of the spindle 9. The follower cams 9G protrude rearward from the rear surface of the flange 9B. The drive cams 72C face the follower cams 9G. The spindle 9 is supported by the gear housing 3 with the spindle bearing 48 in between. The spindle 9 is thus movable in the front-rear direction to have the follower cams 9G in and out of contact with the drive cams 72C. At the advanced position of the spindle 9, the follower cams 9G are out of contact with the drive cams 72C. At the retracted position of the spindle 9, the follower cams 9G come in contact with the drive cams 72C. In the gear housing 3, the sleeve 76 is located radially outward from the drive cams 72C and the follower cams 9G.

At the advanced position of the spindle 9, the brake member 82 locks the rotation of the spindle 9. The brake member 82 restricts unintended rotation of the spindle 9. The brake member 82 is supported by the front housing 32. The brake member 82 surrounds the spindle bearing 48. The circlip 61 is located between the brake member 82 and a portion of the front housing 3. The brake member 82 faces the flange 9B on the spindle 9. The spindle 9 includes front cams 9J. The front cams 9J protrude frontward from the front surface of the flange 9B.

The brake member 82 includes a brake ring 82A, recesses 82B, and brake cams 82C. The brake ring 82A is supported by the front housing 32. The recesses 82B are located on the outer circumference of the brake ring 82A. The brake cams 82C protrude rearward from the rear surface of the brake ring 82A. Protrusions on the inner surface of the front housing 32 are received in the recesses 82B on the brake member 82. This restricts the brake member 82 from rotating relative to the front housing 32. The front cams 9J are located on the front surface of the flange 9B on the spindle 9. At the advanced position of the spindle 9, the brake cams 82C come in contact with the front cams 9J to lock the rotation of the spindle 9.

The tool holder 10 holds the driver bit 30 received in the bit holding hole 9C. The tool holder 10 includes balls 49 and a leaf spring 50. The balls 49 are received in through-holes 9F connecting the outer circumferential surface of the spindle 9 and the inner circumferential surface of the bit holding hole 9C'. The leaf spring 50 is located radially outward from the balls 49 about the rotation axis CX. The leaf spring 50 presses the balls 49 radially inward. The balls 49 are at least partially received in a recess 30A on the driver bit 30. This restricts the driver bit 30 from slipping off the bit holding hole 9C.

The lock ring 11 is operable by the operator to adjust the degree by which the driver bit 30 protrudes from the front end face of the rubber cap 13. The lock ring 11 surrounds the cylindrical portion 32B of the front housing 32. The lock ring 11 rotates relative to the front housing 32. The lock ring 11 thus moves relative to the front housing 32 in the front-rear direction. The cylindrical portion 32B includes a thread 32C on its outer circumferential surface. The lock ring 11 has a threaded groove 11A on its inner circumferential surface. The thread 32C and the threaded groove 11A rotate relative to each other as the lock ring 11 rotates. The lock ring 11 thus moves relative to the front housing 32 in the front-rear direction while rotating. In response to the lock ring 11 rotating in a first direction, the driver bit 30 protrudes by a greater degree. In response to the lock ring 11 rotating in a second direction, the driver bit 30 protrudes by a lesser degree. A leaf spring 51 is located between the lock ring 11 and the cylindrical portion 32B. The leaf spring 51 causes the lock ring 11 to click while rotating.

The adjusting sleeve 12 is attached to the lock ring 11 in a detachable manner. The adjusting sleeve 12 is attached to the lock ring 11 with an O-ring 52 in between. The adjusting sleeve 12 surrounds the spindle 9 at a position frontward from the lock ring 11. The adjusting sleeve 12 is substantially cylindrical. The adjusting sleeve 12 is tapered with its diameter decreasing toward the front. The adjusting sleeve 12 moves in the front-rear direction together with the lock ring 11 as the lock ring 11 rotates.

The rubber cap 13 is attached to the front end of the adjusting sleeve 12. The rubber cap 13 is fixed to the front end of the adjusting sleeve 12 with a cup washer 53 in between. The rubber cap 13 surrounds the driver bit 30 attached to the spindle 9. In a screwing operation using the screwdriver 1, the rubber cap 13 comes in contact with a workpiece. This reduces damage on the workpiece.

The driver bit 30 placed in the bit holding hole 9C and held by the tool holder 10 has its front end located frontward from the front end of the rubber cap 13. To adjust the depth of a screw tightened into the workpiece, the operator rotates the lock ring 11 to move the lock ring 11 in the front-rear direction. This also moves the adjusting sleeve 12 and the rubber cap 13 in the front-rear direction together with the lock ring 11. The degree by which the driver bit 30 protrudes from the front end face of the rubber cap 13 is thus adjusted. This adjusts the depth of the screw tightened into the workpiece.

The trigger lever 14 activates the motor 6. The trigger lever 14 is located on the grip 22A. The trigger lever 14 protrudes frontward from an upper front portion of the grip 22A. A switch 54 is located behind the trigger lever 14. The switch 54 is accommodated in the grip 22A. The trigger lever 14 is connected to the switch 54. When the trigger lever 14 is pulled to move backward, an operation signal is output from the switch 54 to the controller 20. The controller 20 drives the motor 6 in response to the operation signal from the switch 54. When the trigger lever 14 is released from being operated, the motor 6 is stopped.

The lock button 15 retains the trigger lever 14 being pulled. The lock button 15 is located on the upper left of the grip 22A. When the lock button 15 is pressed with the trigger lever 14 being pulled, the trigger lever 14 remains pulled and the motor 6 remains driven after the operator releases the trigger lever 14.

The forward-reverse switch lever 16 is operable to switch the rotation direction of the motor 6. The forward-reverse switch lever 16 is located on the joint 22B. The forward-reverse switch lever 16 is operable to switch the rotation direction of the motor 6 between forward and reverse. This switches the rotation direction of the spindle 9. When the forward-reverse switch lever 16 is at a neutral position the trigger lever 14 is not operable.

The light 17 emits illumination light. The light 17 includes a light-emitting diode (LED). The light 17 is located on a lower front portion of the joint 24. The light 17 illuminates an area ahead of the spindle 9 with illumination light.

The switch plate 18 includes a mode switch button 18A operable by the operator. The switch plate 18 is located on the battery holder 23. The switch plate 18 is located on the upper surface of the battery holder 23 between the lower end of the grip 22A and the lower end of the joint 24. In response to an operation on the mode switch button 18A by the operator, the operational mode of the motor 6 is switched. The operational mode of the motor 6 in the embodiment includes a normal mode and a push-drive mode. In the normal mode, the trigger lever 14 is pulled to activate the motor 6. In the push-drive mode, the motor 6 is not activated immediately after the trigger lever 14 is pulled. The motor 6 is activated in response to detection of the spindle 9 moving backward from the advanced position together with the driver bit 30. The operator operates the mode switch button ISA to set the operation mode of the screwdriver 1 to either the normal mode or the push-drive mode.

When the motor 6 is operated in the push-drive mode, the push-drive assembly 19 detects the spindle 9 moving backward from the advanced position together with the driver bit 30.

The push-drive assembly 19 includes a rod 55, a seal 56, a lever 57, a torsion spring 58, a magnet 59, and a mode sensor board 60.

The rod 55 is received in the through-hole 74A in the countershaft 74. The through-hole 74A extends through the countershaft 74 from its front end face to its rear end face. The through-hole 74A includes the central axis of the countershaft 74. The rod 55 is movable relative to the countershaft 74 in the front-rear direction. The rod 55 has its front end in contact with the support surface 9E of the spindle 9. The rod 55 has its rear end protruding rearward beyond the recess 31B through an opening in the recess 31B on the rear housing 31.

The seal 56 seals the boundary between the outer circumferential surface of the rod 55 and the inner circumferential surface of the through-hole 74A. The seal 56 surrounds the rod 55. The seal 56 is cylindrical. The seal 56 is fixed to the inner circumferential surface of the countershaft 74. The seal 56 serves as a guiding member to guide the rod 55 in the front-rear direction.

The lever 57 is supported by the main housing 2 in a pivotable manner. The main housing 2 includes a pin 2B that supports the lever 57 in a pivotable manner. The pivot axis of the lever 57 extends in the lateral direction. The lever 57 includes a pivotable portion 57A, a first projection 57B, and a second projection 57C. The pivotable portion 57A surrounds the pin 2B. The first projection 57B protrudes downward from the pivotable portion 57A. The second projection 57C protrudes upward from the pivotable portion 57A, The first projection 57B faces the rear end of the rod 55. The second projection 57C faces the mode sensor board 60. As the spindle 9 moves backward from the advanced position, the rod 55 is pushed by the spindle 9 to move backward. The rod 55 then pushes and moves the first projection 57B backward. As the rod 55 moves backward, the lever 57 pivots with the first projection 57B moving backward and the second projection 57C moving forward.

The torsion spring 58 is supported by the pin 2B. The torsion spring 58 applies an elastic force to the lever 57 to cause the first projection 57B to move forward and the second projection 57C to move backward.

The magnet 59 is fixed to the second projection 57C.

The mode sensor board 60 includes a circuit board and the magnetic sensor supported on the circuit board. The mode sensor board 60 at least partially faces the magnet 59 fixed to the second projection 57C. The magnetic sensor detects a change in the magnetic field of the magnet 59 to detect the pivoting of the lever 57. The magnetic sensor transmits a detection signal to the controller 20 through a lead wire (not shown). The mode sensor board 60 is supported by a support rib 2C on the main housing 2. The support rib 2C is located above the fan case 2A.

In the normal mode, the trigger lever 14 is pulled to activate the motor 6. In the push-drive mode, the trigger lever 14 is pulled and the rod 55 moves backward to cause the lever 57 to pivot. This moves the magnet 59 away from the mode sensor board 60, thus activating the motor 6.

The controller 20 outputs a control signal for controlling the motor 6. The controller 20 is accommodated in the battery holder 23. The controller 20 controls the motor 6 in accordance with the operation mode set through an operation on the mode switch button 18A. The controller 20 includes a circuit board 20A and a case 20B. The circuit board 20A incorporates multiple electronic components. The case 20B accommodates the circuit board 20A. Examples of the electronic components incorporated in the circuit board 20A include a processor such as a central processing unit (CPU), a nonvolatile memory such as a read-only memory (ROM) or a storage device, a volatile memory such as a random-access memory (RAM), a transistor, and a resistor.

Clutch Assembly

The clutch assembly 8A transmits a rotational force from the rotor 34 in the motor 6 to the spindle 9 when the spindle 9 moves to the retracted position during forward rotation of the motor 6. The clutch assembly 8A includes the drive cams 72C and the follower cams 9G. The drive cams 72C are located on the clutch cam 72. The follower cams 9G are located on the spindle 9 and face the drive cams 72C. The clutch cam 72 surrounds the countershaft 74. The clutch cam 72 is connected to the drive gear 71 with the balls 73 in between. The clutch assembly SA includes the compression spring 75. The compression spring 75 urges the clutch cam 72 backward and urges the spindle 9 forward.

In the gear housing 3, the sleeve 76 is located radially outward from the drive cams 72C and the follower cams 9G. The sleeve 76 surrounds the cam ring 72A and the flange 9B. The inner circumferential surface of the rear portion of the sleeve 76 is in contact with the rear O-ring 77. The inner circumferential surface of the front portion of the sleeve 76 is in contact with the front O-ring 78. The stoppers 76B on the sleeve 76 are in contact with the front surface of the gear 71B in the drive gear 71. The stoppers 76B having their rear surfaces in contact with the front surface of the gear 71B restrict the sleeve 76 from moving backward relative to the drive gear 71.

To perform a screwing operation on a workpiece, the forward-reverse switch lever 16 is operated to cause the rotor 34 in the motor 6 to rotate in the forward direction. After the driver bit 30 is placed in the bit holding hole 9C and is attached to the rod 9A, the operator grips the handle 22 and places the tip of the driver bit 30 into a cross slot on the head of a screw on the surface of the workpiece. The operator then pulls the trigger lever 14. In the normal mode, the trigger lever 14 is pulled to activate the motor 6. As the rotor 34 rotates, rotation of the rotor shaft 41 is transmitted to the drive gear 71 through the pinion gear 47. The clutch cam 72 connected to the drive gear 71 with the balls 73 in between then rotates together with the drive gear 71. The balls 73 at first ends of the cam ball grooves 72D in the circumferential direction restrict relative rotation between the drive gear 71 and the clutch cam 72. The countershaft 74 rotates together with the drive gear 71.

At the advanced position of the spindle 9, the drive cams 72C are out of contact with the follower cams 9G. A rotational force is not directly transmitted from the clutch cam 72 to the spindle 9 as the drive gear 71 rotates. In this case, the clutch cam 72 is connected to the spindle 9 with the rear O-ring 77, the sleeve 76, and the front O-ring 78 in between. Thus, a rotational force of the clutch can 72 is transmitted to the spindle 9 through the rear O-ring 77, the sleeve 76, and the front O-ring 78. With friction between the sleeve 76 and the rear O-ring 77 and with friction between the sleeve 76 and the front O-ring 78, the rotational force of the clutch cam 72 is transmitted to the spindle 9 through the rear O-ring 77, the sleeve 76, and the front O-ring 78.

At the advanced position of the spindle 9, the front cams 9J are in contact with the brake cams 82C. The brake member 82 thus locks rotation of the spindle 9 when the rotational force of the clutch cam 72 is transmitted to the spindle 9 through the sleeve 76. This restricts unintended rotation of the spindle 9, thus allowing the operator to smoothly place the tip of the driver bit 30 into the cross slot on a screw head.

With the drive gear 71 and the clutch cam 72 rotating, the operator grips the handle 22 and presses the screwdriver 1 against the workpiece to place the screwdriver 1 closer to the workpiece (pressing operation). This causes the spindle 9, together with the driver bit 30, to move backward against an elastic force from the compression spring 75.

With the spindle 9 at an intermediate position after moving from the advanced position, the front cams 9J come out of contact with the brake cams 82C. This causes the brake member 82 to release locking of the rotation of the spindle 9. The intermediate position is between the advanced position and the retracted position. When the spindle 9 moves from the advanced position to the intermediate position, the spindle 9 starts rotating. In this state, the front cams 9J are out of contact with the brake cams 82C, and the drive cams 72C are out of contact with the follower cams 9G. The spindle 9 rotates tinder a rotational force of the clutch cam 72 transmitted through the rear O-ring 77, the sleeve 76, and the front O-ring 78.

At the intermediate position, the spindle 9 rotates with friction between the sleeve 76 and the rear O-ring 77 and with friction between the sleeve 76 and the front O-ring 78. A rotational force of the clutch cam 72 is transmitted to the spindle 9 with friction. The spindle 9 thus rotates at a lower rotational speed than the clutch cam 72, with the drive cams 72C out of contact with the follower cams 9G. Thus, the spindle 9 moves toward the retracted position while rotating at a lower rotational speed than the clutch cam 72. The spindle 9 moves toward the retracted position while rotating, for example, at a rotational speed of 20 to 30% inclusive of the rotational speed of the clutch cam 72.

When the spindle 9 moves to the retracted position, the drive cams 72C come in contact with the follower cams 9G. The spindle 9 moves to the retracted position while rotating under a rotational force of the clutch cam 72 transmitted to the spindle 9 through the sleeve 76. Thus, with the drive cams 72C in contact with the follower cams 9G, the rotational speed of the clutch cam 72 relative to the spindle 9 is lower than when the spindle 9 moves to the retracted position without rotating. This reduces the impact when the drive cams 72C come in contact with the follower cams 9G. This generates less noise when the drive cams 72C come in contact with the follower cams 9G.

When the spindle 9 moves from the advanced position to the retracted position and the drive cams 72C come in contact with the follower cams 9G, the clutch cam 72 receives a resistance force from the spindle 9 in the rotation direction. This causes the balls 73 to roll between the gear ball grooves 71D and the cam ball grooves 72D. The drive gear 71 and the clutch cam 72 thus rotate relative to each other with the balls 73 in between. The balls 73 move from the first ends to the second ends of the cam ball grooves 72D in the circumferential direction, and stop at the second ends of the cam ball grooves 72D. Thus, the drive gear 71 rotates together with the clutch cam 72. As shown in FIG. 13, the cam ball grooves 72D in the embodiment are at least partially inclined in the front-rear direction. Thus, with the drive cams 72C in contact with the follower cams 9G the drive gear 71 rotates relative to the clutch cam 72 with the balls 73 in between. This causes the clutch cam 72 to move forward.

With the clutch cam 72 moving forward and the drive cams 72C in contact with the follower cams 9G, the motor 6 is driven. The spindle 9 then rotates under a rotational force of the clutch cam 72 transmitted through the clutch assembly 8A including the drive cams 72C and the follower cams 9G. The driver bit 30 rotates forward together with the spindle 9 to drive the screw into the workpiece.

During a screwing operation, the operator continues the pressing operation on the screwdriver 1. The sleeve 76 includes the stoppers 76B in contact with the front surface of the drive gear 71. This restricts the sleeve 76 from moving backward together with the spindle 9 when the spindle 9 moves from the advanced position to the retracted position in response to the pressing operation.

As the screwing operation continues, the screwdriver 1 gradually approaches the workpiece, and then the front end of the rubber cap 13 comes in contact with the workpiece. As the screwing operation continues, the spindle 9 moves forward while rotating. At an initial stage of the screwing operation, large torque is applied from the screw to the spindle 9 through the driver bit 30. At a final stage of the screwing operation, less torque is applied from the screw to the spindle 9 through the driver bit 30. As less torque is applied to the spindle 9 through the driver bit 30, a contact force between the drive cams 72C and the follower cams 9G decreases. The clutch can 72 then moves backward under an urging force from the compression spring 75. The drive cams 72C thus come out of contact with the follower cams 93, stopping the rotation of the spindle 9. This completes the screwing operation.

After the drive cams 72C come out of contact with the follower cams 9G and the spindle 9 stops rotating, the motor 6 continues driving while the trigger lever 14 is being pulled. When the trigger lever 14 is released from being operated, the motor 6 is stopped. When the pressing operation is released and the driver bit 30 is separate from the screw, the spindle 9 returns to the advanced position under an urging force from the compression spring 75. This causes the brake cams 82C to come in contact with the front cams 9J, restricting unintended rotation of the spindle 9.

In the push-drive mode, pressing the trigger lever 14 alone does not activate the motor 6. When the spindle 9 moves backward in response to the pressing operation performed on the screwdriver 1 with the trigger lever 14 being pulled, the rod 55 in contact with the support surface 9E of the spindle 9 moves backward. The lever 57 then pivots to cause the magnet 59 to be separate from the mode sensor board 60. The controller 20 activates the motor 6 in response to a change in the magnetic field detected by the mode sensor board 60. This causes the clutch cam 72 to start rotating. At the intermediate position of the spindle 9, the brake cams 82C are out of contact with the front cams 9J, and the drive cams 72C are out of contact with the follower cams 9G. The spindle 9 then rotates under a rotational force of the clutch cam 72 transmitted through the sleeve 76. The spindle 9 moves toward the retracted position while rotating, with the pressing operation being continued. When the spindle 9 moves to the retracted position and the drive cams 72C come in contact with the follower cams 9G, the spindle 9 rotates under a rotational force of the clutch cam 72 transmitted through the clutch assembly 8A including the drive cams 72C and the follower cams 9G. The driver bit 30 rotates forward together with the spindle 9 to drive the screw into the workpiece.

As the screwing operation continues, the screwdriver 1 gradually approaches the workpiece, and then the front end of the rubber cap 13 comes in contact with the workpiece. As less torque is applied to the spindle 9 through the driver bit 30, the clutch cam 72 moves backward under an urging force from the compression spring 75. The drive cams 72C thus come out of contact with the follower cams 9G, stopping the rotation of the spindle 9. This completes the screwing operation.

When the pressing operation is released after completion of the screwing operation and the driver bit 30 is separate from the screw, the spindle 9 returns to the advanced position under an urging force from the compression spring 75. This causes the brake cams 82C to come in contact with the front cams 9J, restricting unintended rotation of the spindle 9. In addition, the lever 57 pivots under an elastic force from the torsion spring 58 to move the magnet 59 closer to the mode sensor board 60. The controller 20 stops the motor 6 in response to a change in the magnetic field detected by the mode sensor board 60.

Spindle Locking Assembly

The spindle locking assembly 8B transmits a rotational force from the rotor 34 in the motor 6 to the spindle 9 during reverse rotation of the motor 6. The countershaft 74 includes its front portion received in the reception hole 9D in the spindle 9. The countershaft 74 includes its rear portion connected to the drive gear 71. The countershaft 74 rotates about the rotation axis CX as the rotor 34 rotates. The spindle locking assembly 8B has the reception hole 9D and the countershaft 74 placed in the reception hole 9D.

The pin support 74E is defined on the front portion of the countershaft 74 placed in the reception hole 9D. As described with reference to FIG. 18, the pin support 74E includes the larger-diameter portions 74K and the smaller-diameter portions 74J. The smaller-diameter portions 74J are at positions circumferentially different from the positions of the larger-diameter portions 74K. The radial distance LK from the rotation axis CX to the outer circumferential surface of the larger-diameter portion 74K is greater than the radial distance LJ from the rotation axis CX to the outer circumferential surface of the smaller-diameter portion 74J.

The spindle locking assembly 8B includes the lock pins 79 surrounding the pin support 74E. During reverse rotation of the rotor 34, the lock pins 79 are held between the outer circumferential surfaces of the larger-diameter portions 74K and the inner circumferential surface of the reception hole 9D. Thus, the lock pins 79 lock the countershaft 74 and the spindle 9. In other words, the lock pins 79 serve as wedges that lock the countershaft 74 and the spindle 9 to restrict relative rotation between the countershaft 74 and the spindle 9. During reverse rotation of the rotor 34, the countershaft 74 and the spindle 9 locked by the lock pins 79 do not rotate relative to each other but rotate together. The countershaft 74 and the spindle 9 rotate together with the lock pins 79 serving as wedges. Rotation of the drive gear 71 is thus transmitted to the spindle 9 through the spindle locking assembly 8B including the countershaft 74 and the lock pins 79.

During forward rotation of the rotor 34, the lock pins 79 are between the outer circumferential surfaces of the smaller-diameter portions 74J and the inner circumferential surface of the reception hole 9D. During forward rotation of the rotor 34, the lock pins 79 do not serve as wedges. During forward rotation of the rotor 34, the countershaft 74 and the spindle 9 can rotate relative to each other.

The countershaft 74 includes, at the rear end of the pin support 74E, the stop surfaces 74G facing the rear end faces of the lock pins 79. The spindle locking assembly 8B includes the compression spring 81. The compression spring 81 urges the lock pins 79 backward to press the rear end faces of the lock pins 79 against the stop surfaces 74G.

The spindle locking assembly 8B includes the sleeve 80 in contact with the front end faces of the lock pins 79. The compression spring 81 has its rear end connected to the front surface of the sleeve 80. The compression spring 81 has its front end connected to the support surface 9E defining the front portion of the reception hole 9D. The compression spring 81 urges the lock pins 79 backward through the sleeve 80.

The spindle locking assembly 8B has pin grooves 9L on the inner circumferential surface of the reception hole 9D. Each lock pin 79 is at least partially received in the corresponding pin groove 9L. The pin grooves 9L are elongated in the front-rear direction. Each pin groove 9L has its rear end located frontward from the rear end of the reception hole 9D. As shown in FIG. 22, the pin grooves 9L are located on the inner circumferential surface of the reception hole 9D at circumferentially equal intervals. A cylinder 9M is located radially inward from the groove 9K on the rear surface of the spindle 9. The cylinder 9M has a slope 9N on its inner circumferential surface at the rear end. The slope 9N is inclined radially outward toward the rear. As shown in FIGS. 5 and 7, the front end of the compression spring 75 surrounds the cylinder 9M.

The lock pins 79 are removed from the pin grooves 9L when the lock pins 79 are between the outer circumferential surfaces of the smaller-diameter portions 74J and the inner circumferential surface of the reception hole 9D.

At the advanced position of the spindle 9 with the lock pins 79 between the outer circumferential surfaces of the larger-diameter portions 74K and the inner circumferential surface of the reception hole 9D, the lock pins 79 are removed from the pin grooves 9L. The ridges 74M are located on the outer circumferential surface of the rear portion of the pin support 74E. At the advanced position of the spindle 9 with the lock pins 79 between the outer circumferential surfaces of the larger-diameter portions 74K and the inner circumferential surface of the reception hole 9D, the ridges 74M come in contact with the lock pins 79. This moves the lock pins 79 in the radial direction to remove the lock pins 79 from the pin grooves 9L.

At the retracted position of the spindle 9 with the lock pins 79 between the outer circumferential surfaces of the larger-diameter portions 74K and the inner circumferential surface of the reception hole 9D, the lock pins 79 are received in the pin grooves 9L.

In the embodiment, when the lock pins 79 are between the outer circumferential surfaces of the larger-diameter portions 74K and the inner circumferential surface of the reception hole 9D and received in the pin grooves 9L, the lock pins 79 lock the countershaft 74 and the spindle 9. When the lock pins 79 are between the outer circumferential surfaces of the larger-diameter portions 74K and the inner circumferential surface of the reception hole 9D but are removed from the pin grooves 9L, the countershaft 74 and the spindle 9 are unlocked.

To perform a screwing operation to tighten a screw on a workpiece, the motor 6 rotates in the forward direction. To perform an unscrewing operation to remove a screw from a workpiece, the motor 6 rotates in the reverse direction. In the screwing operation and in the unscrewing operation, the pressing operation is performed on the screwdriver 1 to place the screwdriver 1 closer to the workpiece, with the tip of the driver bit 30 placed in the cross slot on a screw head. This causes the spindle 9 to move from the advanced position to the retracted position. The spindle locking assembly 8B in the embodiment transmits a rotational force from the rotor 34 to the spindle 9 when the spindle 9 moves to the retracted position. In other words, when the spindle 9 moves to the retracted position in response to the pressing operation during reverse rotation of the rotor 34, the lock pins 79 lock the countershaft 74 and the spindle 9.

Figure 23:
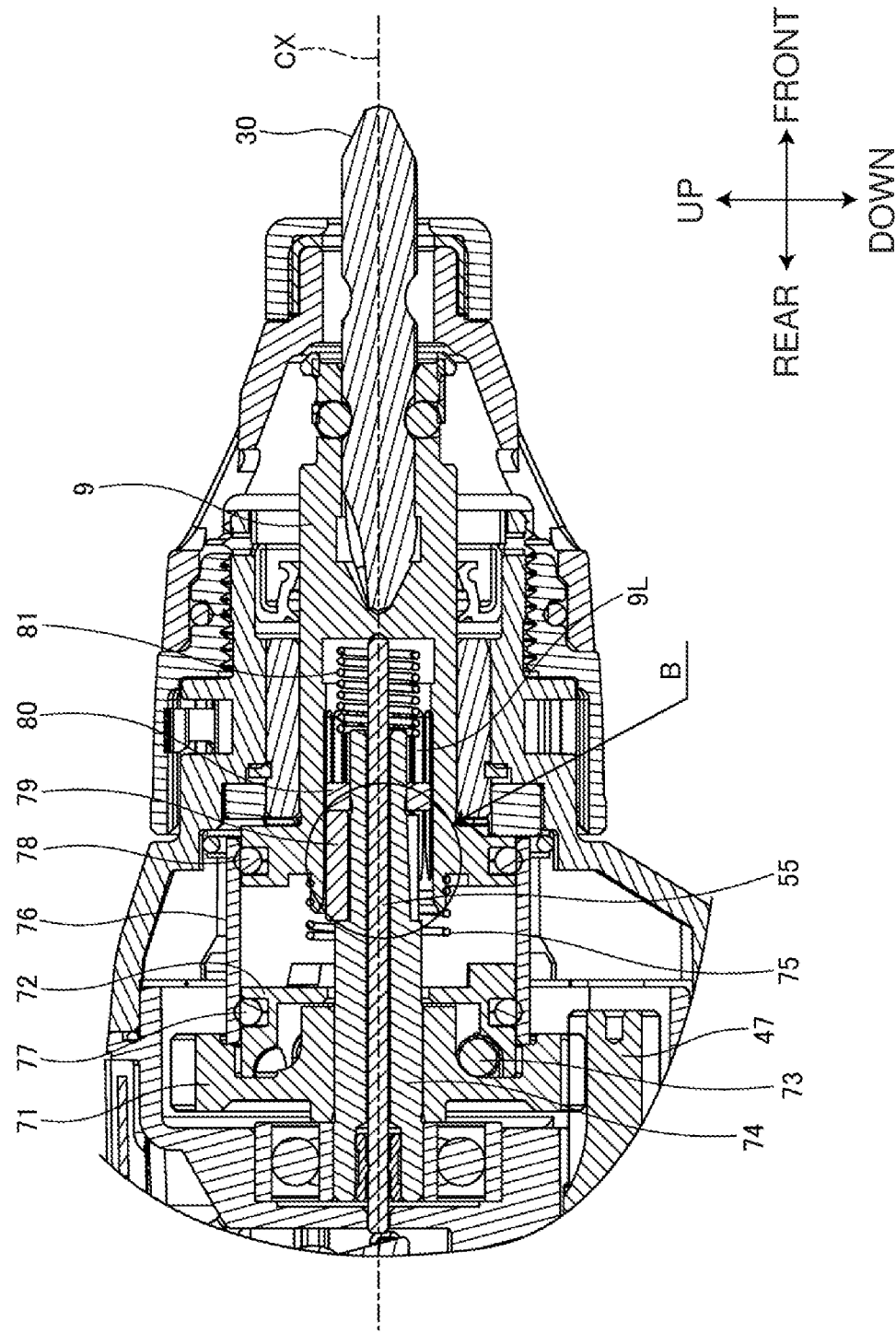
FIG. 23 is a sectional view of a portion of the screwdriver with no pressing operation being performed during forward rotation of a rotor.
Figure 24:
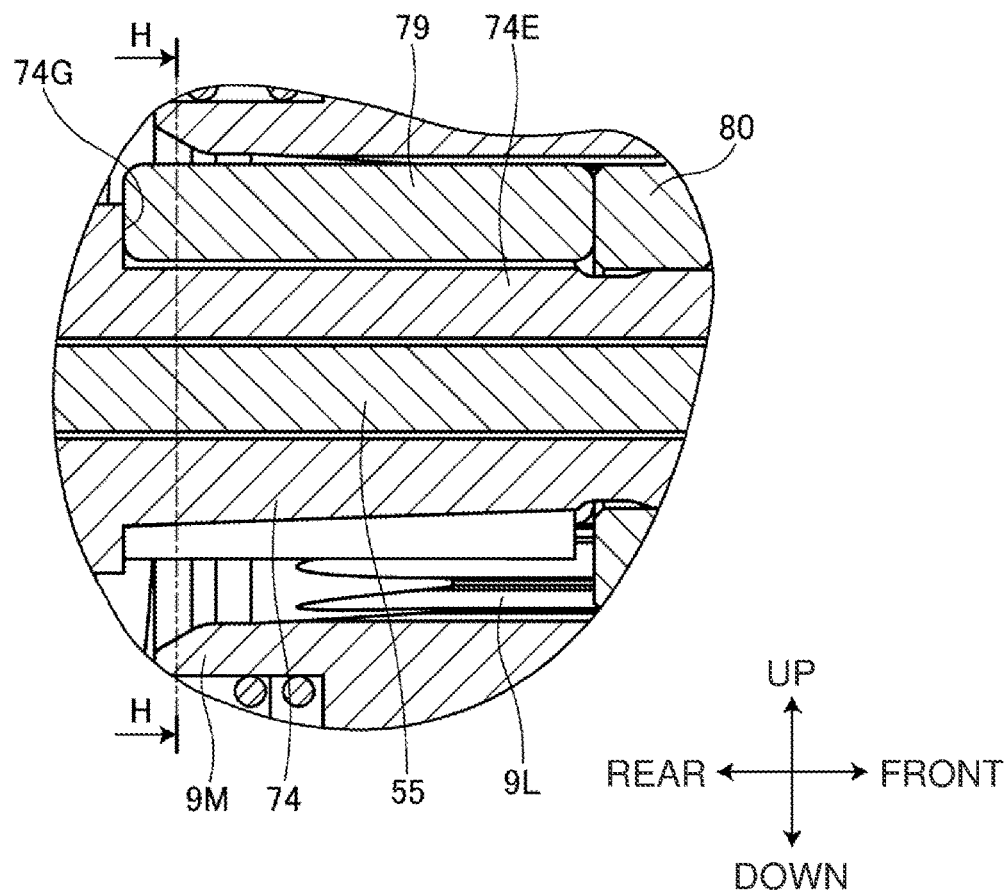
FIG. 24 is an enlarged view of part B in FIG. 23.
Figure 25:
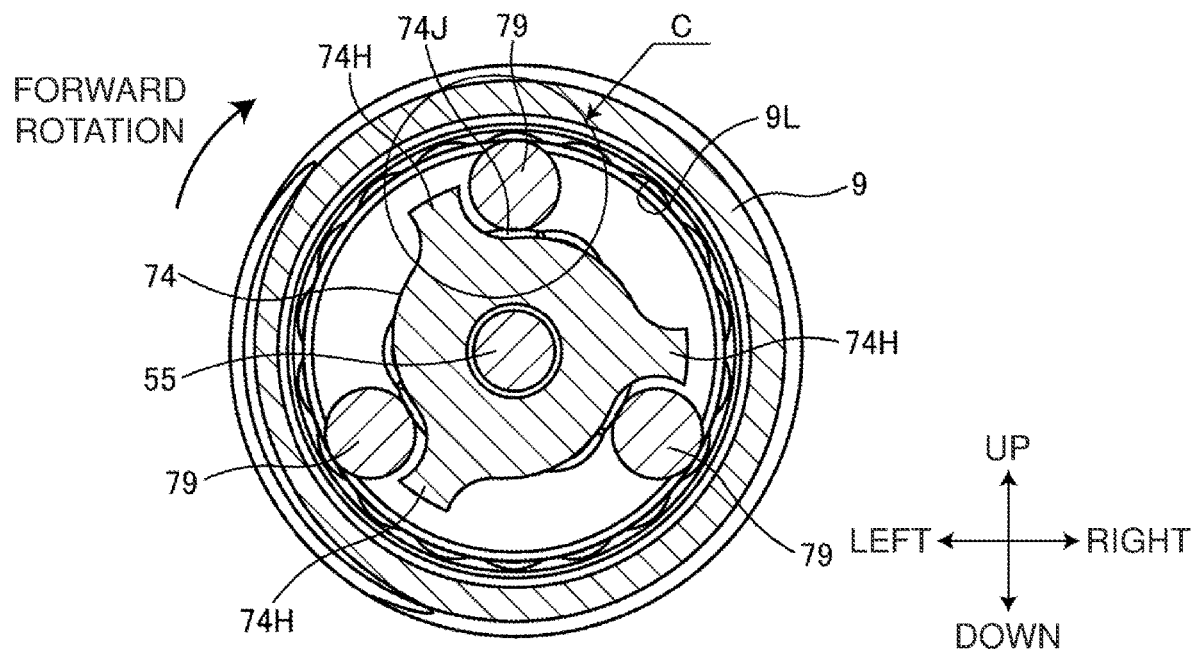
FIG. 25 is a sectional view taken along line H-H as viewed in the direction indicated by arrows in FIG. 24.
Figure 26:
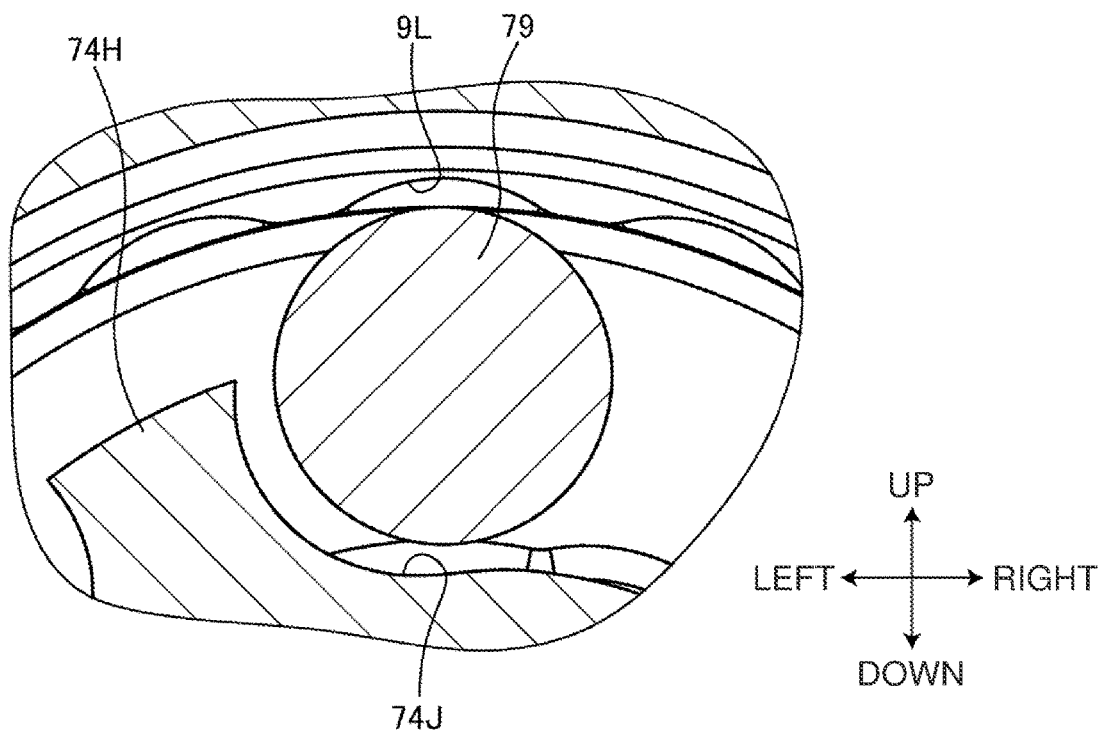
FIG. 26 is an enlarged view of part C in FIG. 25.

FIG. 23 is a sectional view of a portion of the screwdriver 1 with no pressing operation being performed during forward rotation of the rotor 34. FIG. 24 is an enlarged view of part B in FIG. 23. FIG. 25 is a sectional view taken along line H-H as viewed in the direction indicated by arrows in FIG. 24. FIG. 26 is an enlarged view of part C in FIG. 25.

Figure 27:
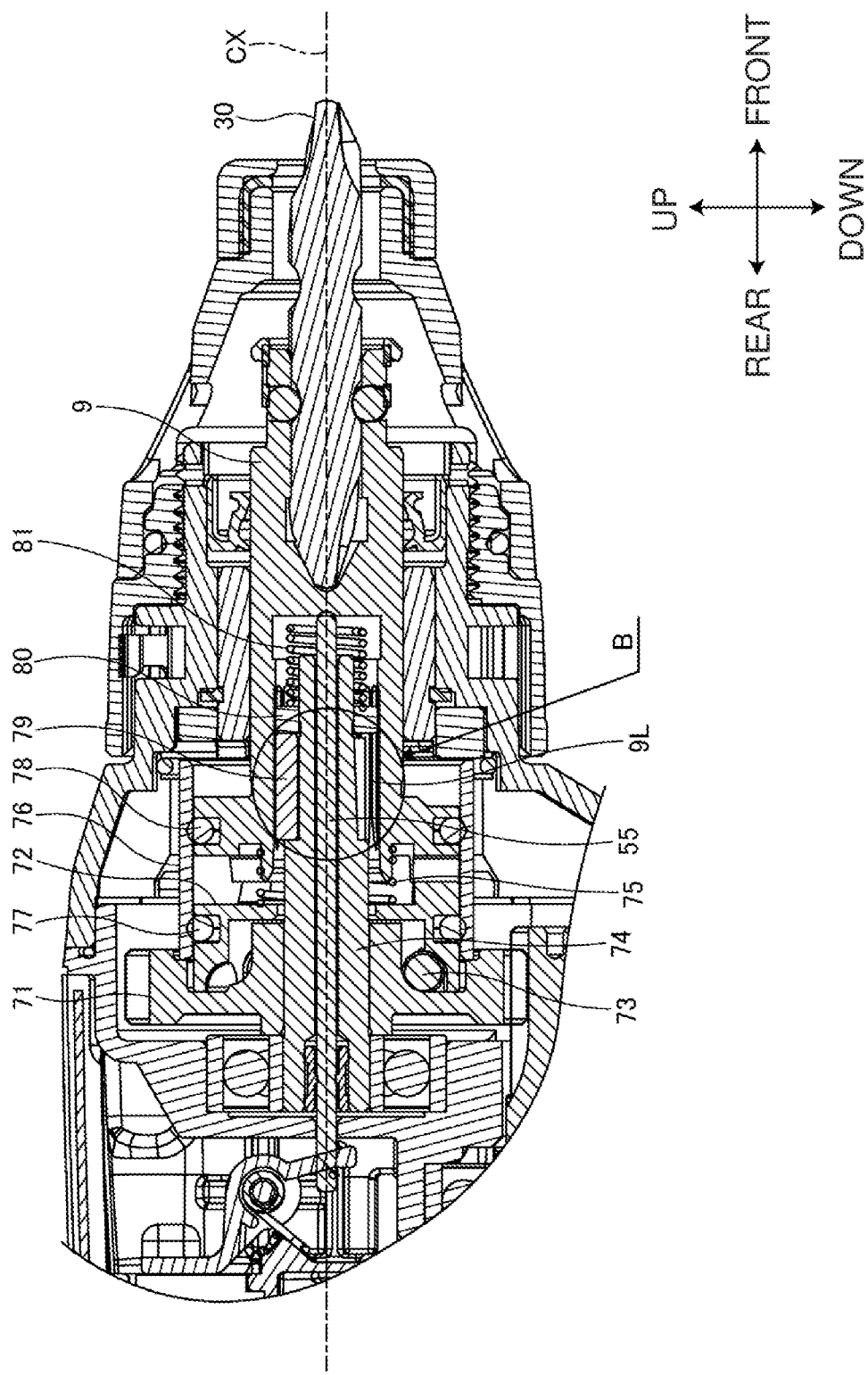
FIG. 27 is a sectional view of a portion of the screwdriver with a pressing operation being performed during forward rotation of the rotor.

FIG. 27 is a cross-sectional view of a portion of the screwdriver 1 with the pressing operation being performed during forward rotation of the rotor 34. In FIG. 27, the driver bit 30 is pressed, but the clutch assembly 5A is not coupled.

Figure 28:
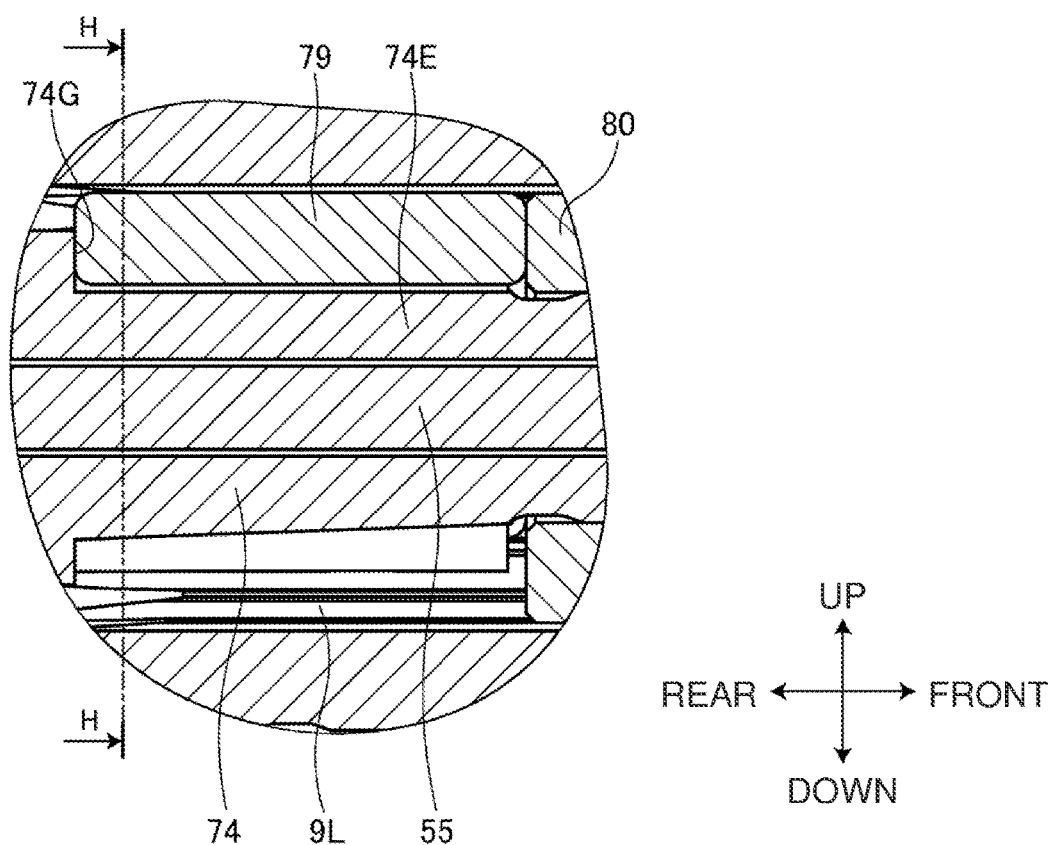
FIG. 28 is an enlarged view of part B in FIG. 27.
Figure 29:
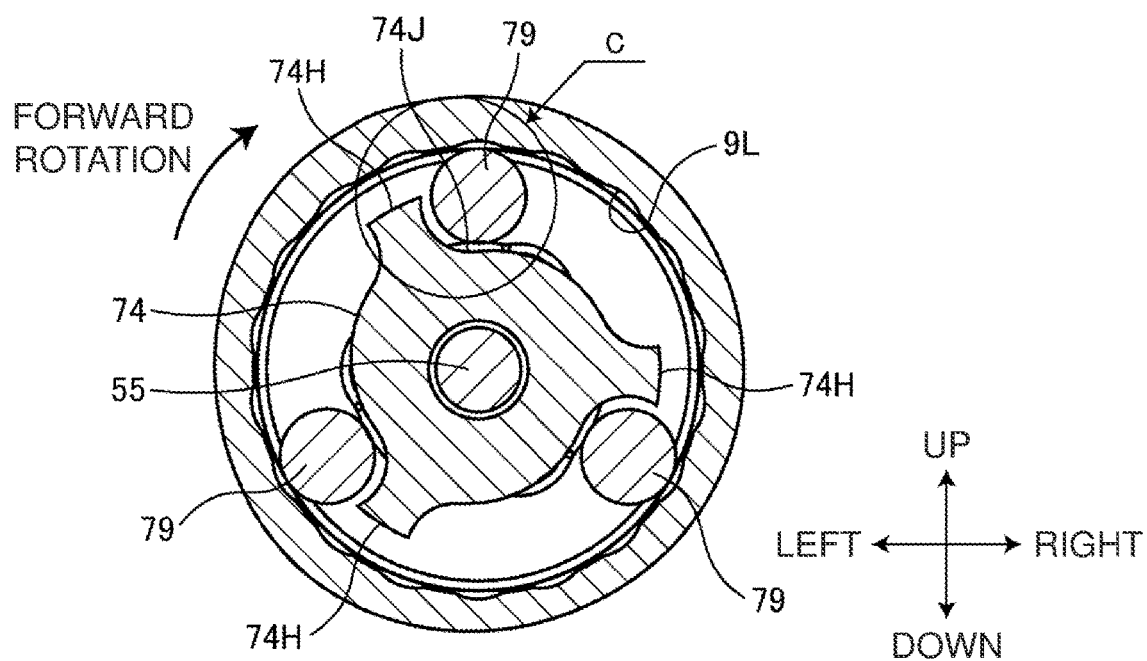
FIG. 29 is a sectional view taken along line H-H as viewed in the direction indicated by arrows in FIG. 28.
Figure 30:
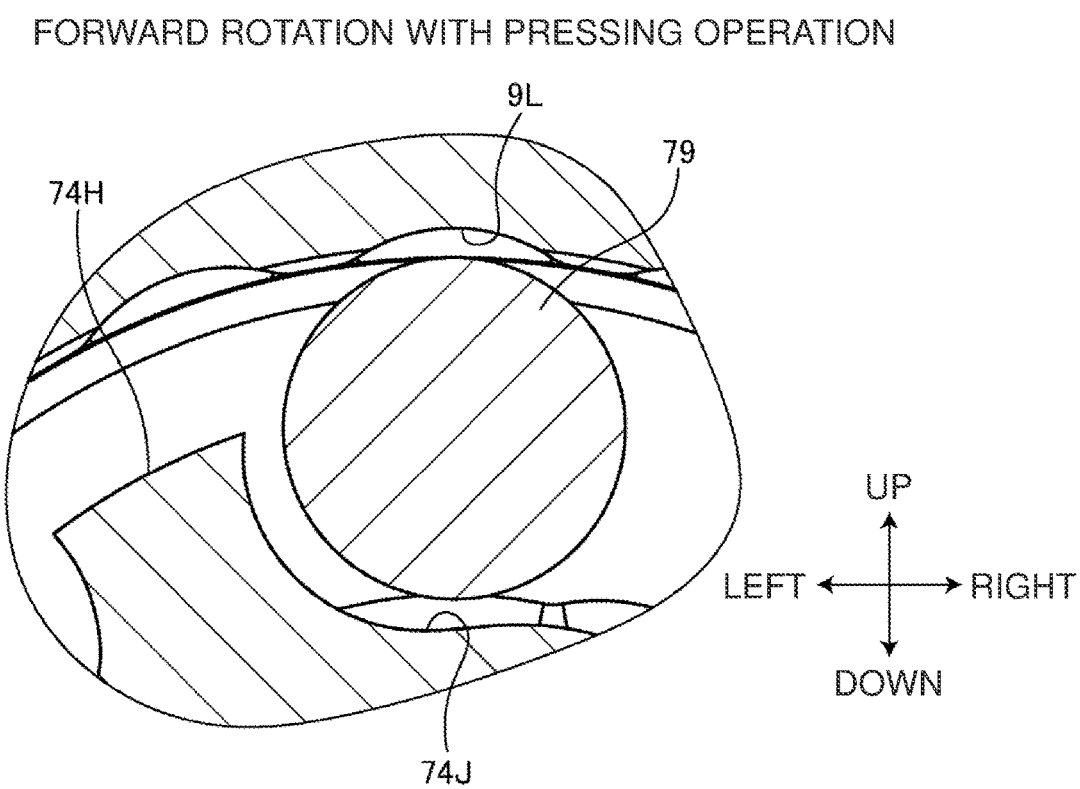
FIG. 30 is an enlarged view of part C in FIG. 29.

FIG. 28 is an enlarged view of part B in FIG. 27. FIG. 29 is a cross-sectional view taken along line H-H as viewed in the direction indicated by arrows in FIG. 28. FIG. 30 is an enlarged view of part C in FIG. 29.

Figure 31:
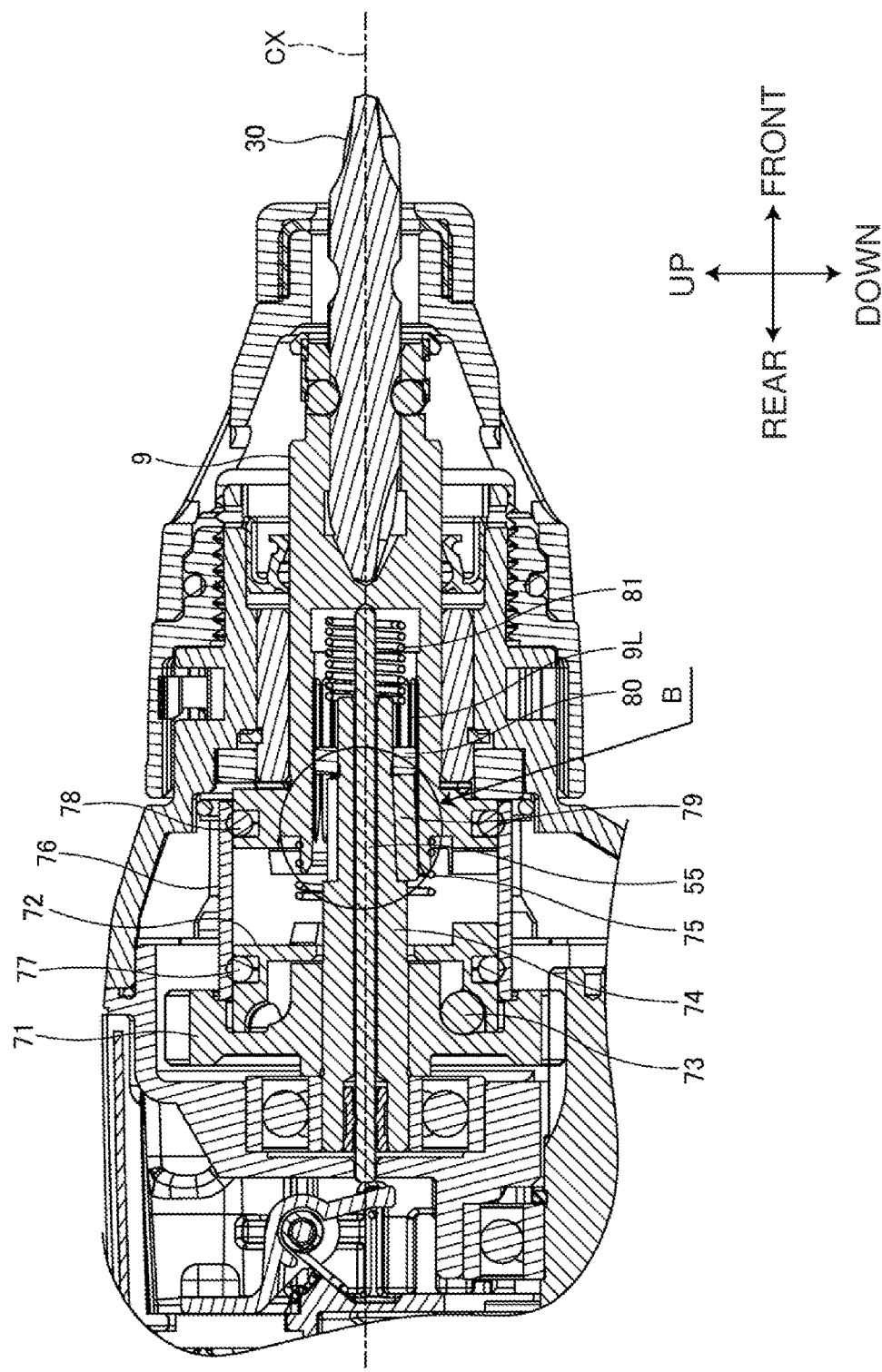
FIG. 31 is a sectional view of a portion of the screwdriver with no pressing operation being performed during reverse rotation of the rotor.
Figure 32:
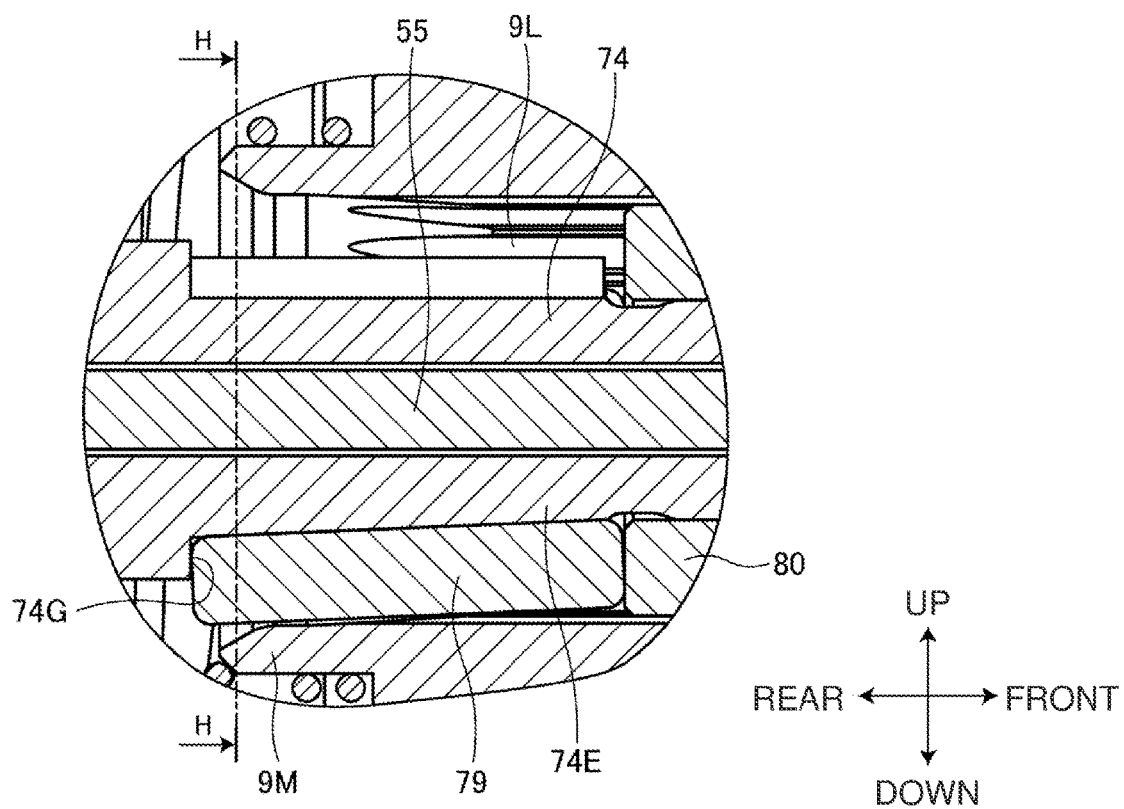
FIG. 32 is an enlarged view of part B in FIG. 31.
Figure 33:
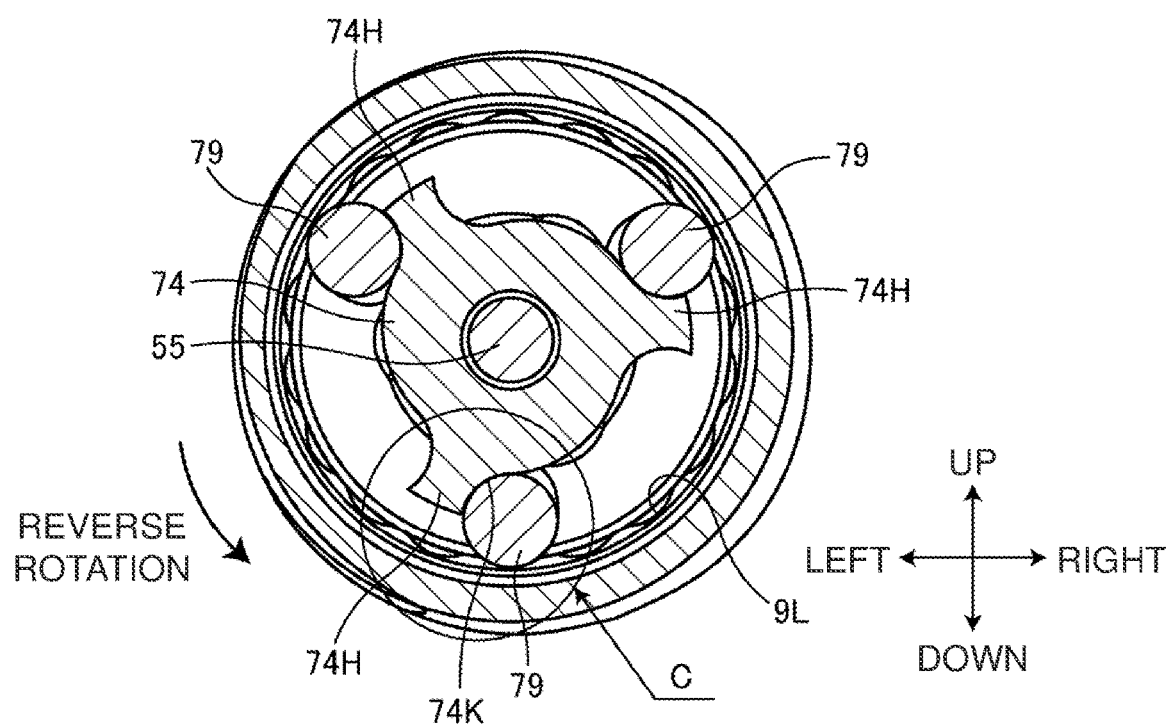
FIG. 33 is a sectional view taken along line H-H as viewed in the direction indicated by arrows in FIG. 31.
Figure 34:
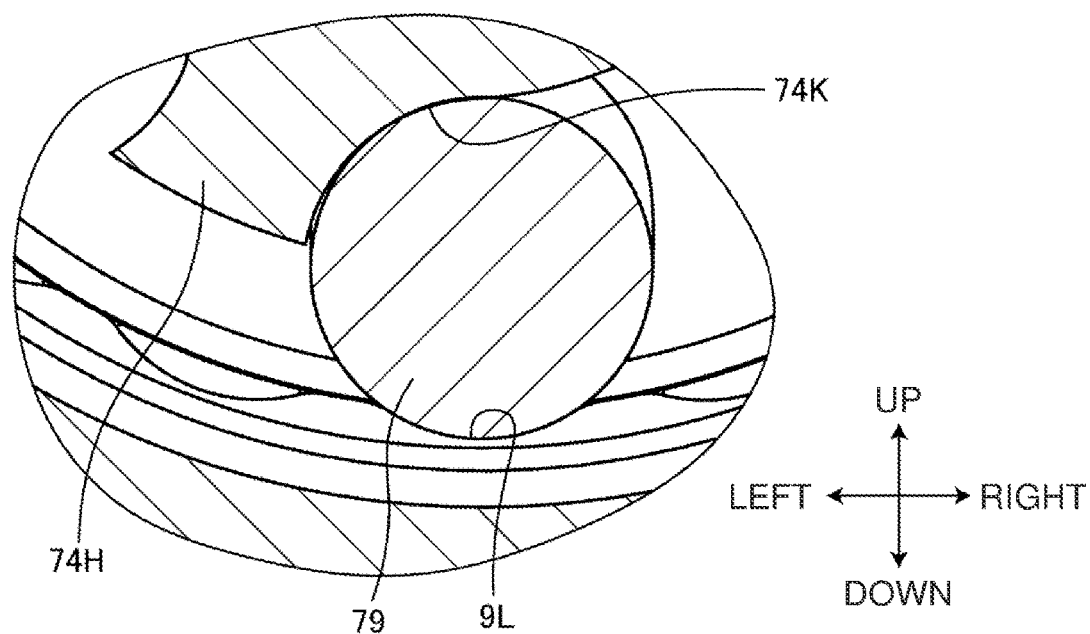
FIG. 34 is an enlarged view of part C in FIG. 33.

FIG. 31 is a cross-sectional view of a portion of the screwdriver 1 with no pressing operation being performed during reverse rotation of the rotor 34. FIG. 32 is an enlarged view of part B in FIG. 31. FIG. 33 is a cross-sectional view taken along line H-H as viewed in the direction indicated by arrows in FIG. 32. FIG. 34 is an enlarged view of part C in FIG. 33.

Figure 35:
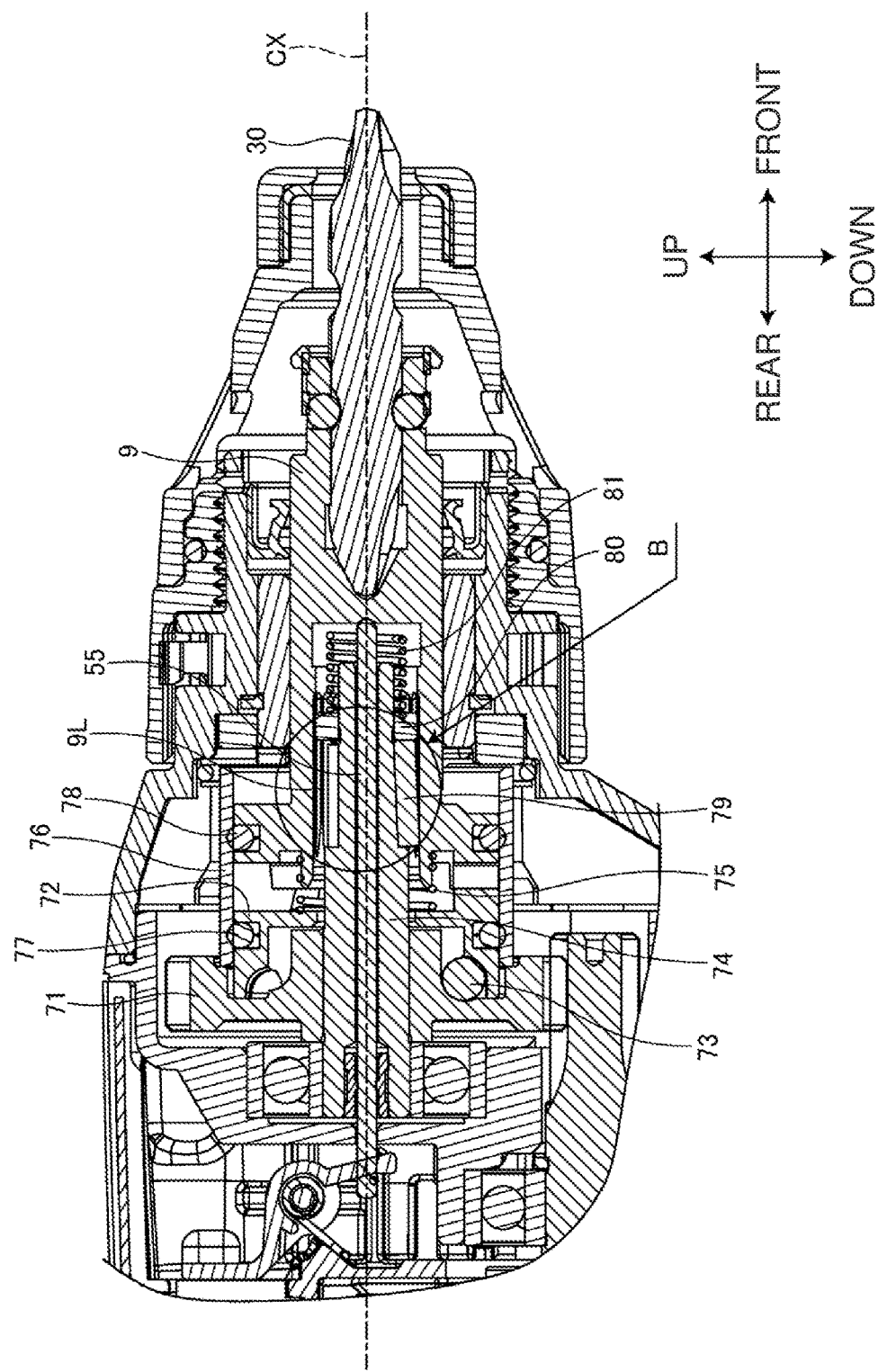
FIG. 35 is a sectional view of a portion of the screwdriver with the pressing operation being performed during reverse rotation of the rotor.
Figure 36:
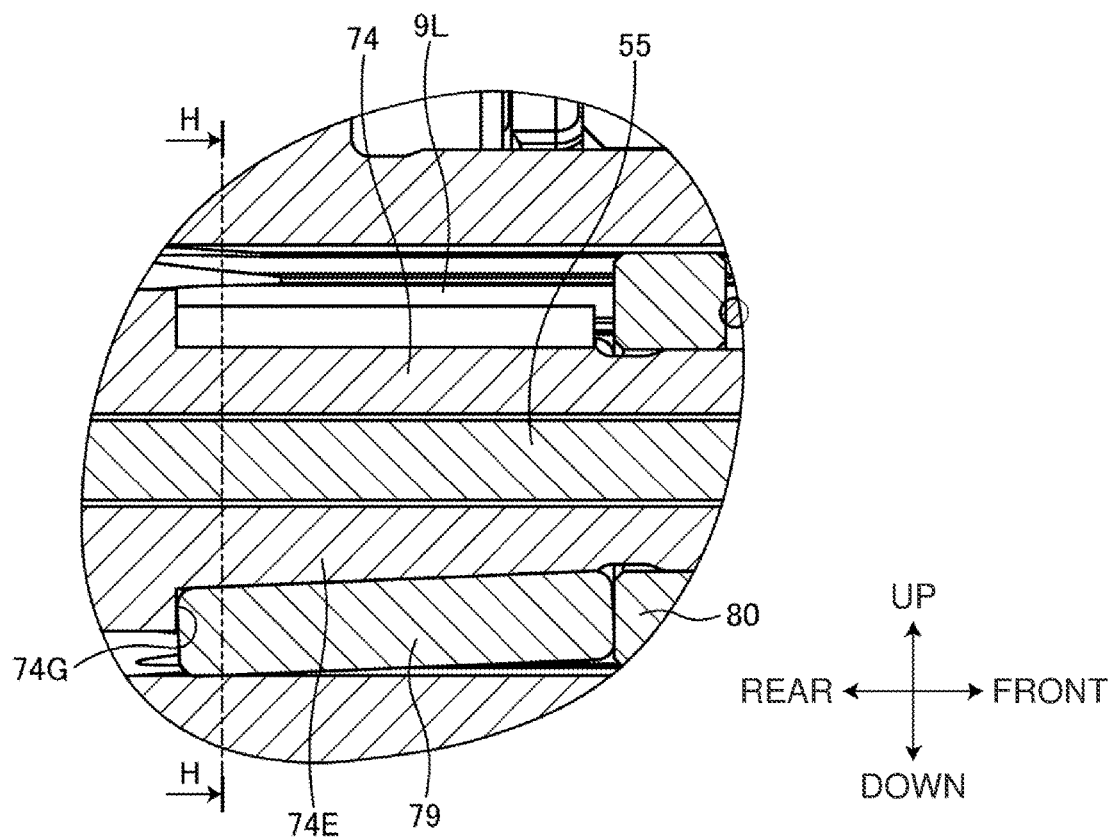
FIG. 36 is an enlarged view of part B in FIG. 35.
Figure 37:
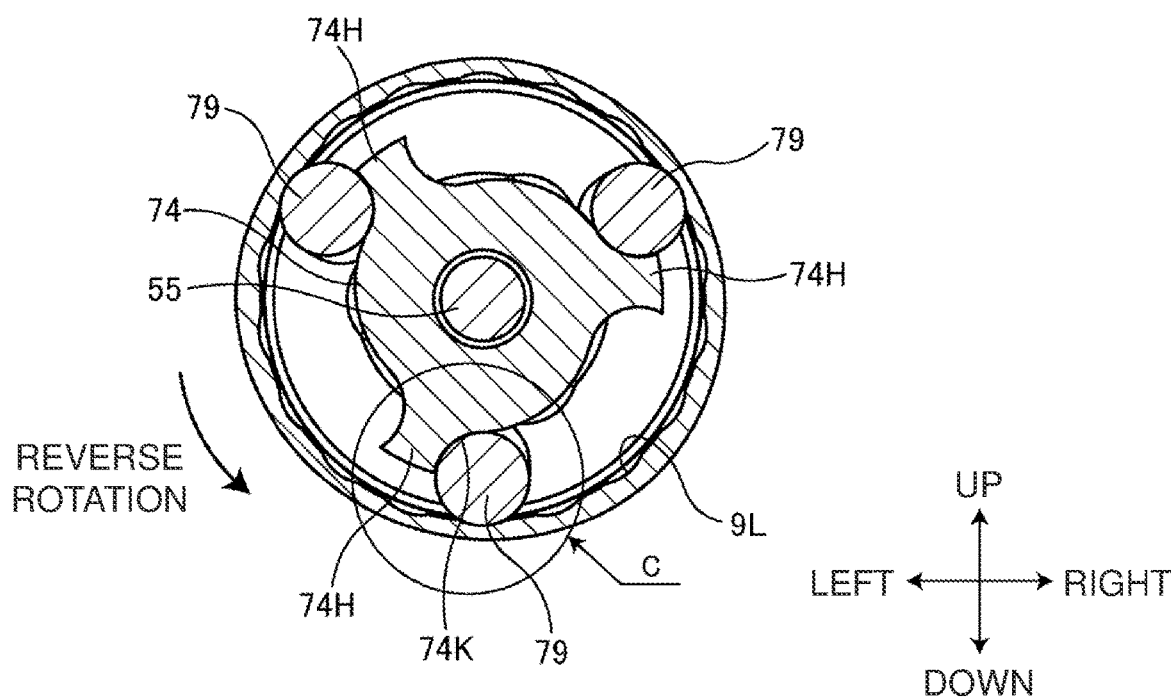
FIG. 37 is a sectional view taken along line II-f as viewed in the direction indicated by arrows in FIG. 36.
Figure 38:
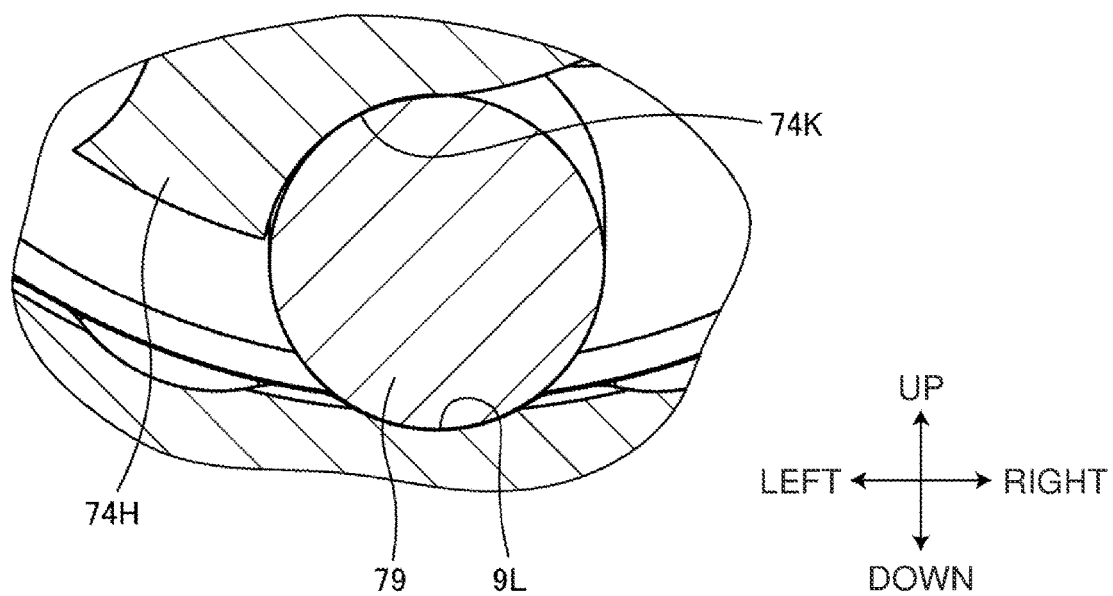
FIG. 38 is an enlarged view of part C in FIG. 37.

FIG. 35 is a cross-sectional view of a portion of the screwdriver 1 with the pressing operation being performed during reverse rotation of the rotor 34. In FIG. 35, the driver bit 30 is pressed, but the clutch assembly SA is not coupled. FIG. 36 is an enlarged view of part B in FIG. 35. FIG. 37 is a cross-sectional view taken along line I-I-H as viewed in the direction indicated by arrows in FIG. 36. FIG. 38 is an enlarged view of part C in FIG. 37.

As shown in FIGS. 23 to 26, the lock pins 79 are between the outer circumferential surfaces of the smaller-diameter portions 74J and the inner circumferential surface of the reception hole 9D during forward rotation of the rotor 34. The spindle 9 is at the advanced position with the pressing operation yet to be performed. The lock pins 79 between the outer circumferential surfaces of the smaller-diameter portions 74J and the inner circumferential surface of the reception hole 9) are removed from the pin grooves 9L. Thus, the countershaft 74 and the spindle 9 are unlocked and can rotate relative to each other. The lock pins 79 are in contact with the protrusions 74H. When the countershaft 74 rotates forward inside the spindle 9, the lock pins 79 rotate about the rotation axis CX inside the spindle 9 while being pushed by the protrusions 74H.

As shown in FIGS. 27 to 30, during forward rotation of the rotor 34, the lock pins 79 are between the outer circumferential surfaces of the smaller-diameter portions 74J and the inner circumferential surface of the reception hole 9D. The spindle 9 is at the retracted position with the pressing operation being performed. The lock pins 79 are between the outer circumferential surfaces of the smaller-diameter portions 74J and the inner circumferential surface of the reception hole 9D and are thus removed from the pin grooves 9L. Thus, the countershaft 74 and the spindle 9 are unlocked and can rotate relative to each other. The lock pins 79 are in contact with the protrusions 74H. When the countershaft 74 rotates forward inside the spindle 9, the lock pins 79 rotate about the rotation axis CX inside the spindle 9 while being pushed by the protrusions 74H.

As shown in FIGS. 31 to 34, during reverse rotation of the rotor 34, the lock pins 79 are between the outer circumferential surfaces of the larger-diameter portions 74K and the inner circumferential surface of the reception hole 9D. The spindle 9 is at the advanced position with the pressing operation yet to be pressed. As shown in FIG. 32, the rear end of each lock pin 79 is located rearward from the rear end of the reception hole 9D. With the ridges 74M in contact with the rear ends of the lock pins 79, the lock pins 79 move radially to be removed from the pin grooves 9L as shown in FIG. 32. In the example shown in FIG. 32, each lock pin 79 is inclined radially outward toward the rear. The lock pins 79 are between the outer circumferential surfaces of the larger-diameter portions 74K and the inner circumferential surface of the reception hole 9D but are removed from the pin grooves 9L Thus, the countershaft 74 and the spindle 9 are unlocked and can rotate relative to each other. During reverse rotation of the rotor 34, the spindle 9 does not rotate unless the pressing operation is performed, with the countershaft 74 and the spindle 9 being unlocked.

During reverse rotation of the rotor 34, as shown in FIGS. 35 to 38, the lock pins 79 are between the outer circumferential surfaces of the larger-diameter portions 74K and the inner circumferential surface of the reception hole 9D. The spindle 9 is at the retracted position with the pressing operation being performed. At the retracted position of the spindle 9 with the lock pins 79 between the outer circumferential surfaces of the larger-diameter portions 74K and the inner circumferential surface of the reception hole 9D, the lock pins 79 are received in the pin grooves 9L. Thus, the countershaft 74 and the spindle 9 are locked and rotate together. During reverse rotation of the rotor 34, the countershaft 74 and the spindle 9 rotate together in the reverse direction with the pressing operation being performed. The unscrewing operation is performed in this manner.

At the retracted position of the spindle 9, the positions of the drive cams 72C may overlap at least parts of the positions of the follower cams 9G in the front-rear direction. In the embodiment, the countershaft 74 and the spindle 9 are locked to prevent the drive cams 72C and the follower cams 9G from coming in contact with each other when the positions of the drive cams 72C overlap at least parts of the positions of the follower cams 9G in the front-rear direction. In other words, the countershaft 74 and the spindle 9 are locked to allow the drive cams 72C and the follower cams 9G to be at circumferentially different positions when the positions of the drive cams 72C overlap at least parts of the positions of the follower cams 9G in the front-rear direction.

As described above, the screwdriver 1 according to the embodiment includes the gear housing 3, the motor 6, the spindle 9, the clutch assembly SA, and the spindle locking assembly 8B. The motor 6 includes the stator 33 and the rotor 34 rotatable relative to the stator 33. The spindle 9 includes the rod 9A to which the driver bit 30 is attachable, and is supported by the gear housing 3 in a manner movable between the advanced position and the retracted position in the front-rear direction. The spindle 9 has the reception hole 9D extending frontward from the rear end face of the spindle 9. The clutch assembly 8A transmits a rotational force from the rotor 34 to the spindle 9 when the spindle 9 moves to the retracted position during forward rotation of the rotor 34. The spindle locking assembly 8B transmits the rotational force from the rotor 34 to the spindle 9 during reverse rotation of the rotor 34. The spindle locking assembly 8B includes the reception hole 9D and the countershaft 74 placed in the reception hole 9D. The countershaft 74 placed in the reception hole 9D rotates about the rotation axis CX as the rotor 34 rotates.

In the above structure, the rotational force from the rotor 34 is transmitted to the spindle 9 through the clutch assembly 8A during forward rotation of the rotor 34. After the driver bit 30 attached to the spindle 9 is placed into the cross slot on a screw head, the rotor 34 is rotated in the forward direction and a screwing operation is performed smoothly. During reverse rotation of the rotor 34, a rotational force from the rotor 34 is transmitted to the spindle 9 through the spindle locking assembly 8B. After the driver bit 30 attached to the spindle 9 is placed into the cross slot on the screw head, the rotor 34 is rotated in the reverse direction and an unscrewing operation is performed smoothly.

The spindle locking assembly 8B in the embodiment transmits a rotational force from the rotor 34 to the spindle 9 when the spindle 9 moves to the retracted position.

Thus, the spindle 9 rotates when the operator performs the pressing operation on the screwdriver 1 to place the screwdriver 1 closer to the workpiece and the spindle 9 moves to the retracted position. In other words, the spindle 9 does not rotate until the pressing operation is performed, and the spindle 9 rotates when the pressing operation is performed. The operator can start an unscrewing operation by performing the pressing operation.

In the embodiment, the countershaft 74 placed in the reception hole 9D includes the front portion defining the pin support 74E. The pin support 74E includes the larger-diameter portions 74K and the smaller-diameter portions 74J at the positions circumferentially different from the positions of the larger-diameter portions 74K. The radial distance ILK from the rotation axis CX to the outer circumferential surface of the larger-diameter portion 74K is greater than the radial distance LJ from the rotation axis CX to the outer circumferential surface of the smaller-diameter portion 74J. The spindle locking assembly 8B includes the lock pins 79 surrounding the pin support 74E. The lock pins 79 are held between the outer circumferential surfaces of the larger-diameter portions 74K and the inner circumferential surface of the reception hole 9D during reverse rotation of the rotor 34.

The lock pins 79 held between the outer circumferential surfaces of the larger-diameter portions 74K and the inner circumferential surface of the reception hole 9D serve as wedges to lock the countershaft 74 and the spindle 9. This restricts relative rotation between the countershaft 74 and the spindle 9 and causes the countershaft 74 and the spindle 9 to rotate together. Thus, a rotational force from the rotor 34 is transmitted to the spindle 9 through the countershaft 74 during reverse rotation of the rotor 34.

In the embodiment, the lock pins 79 are between the outer circumferential surfaces of the smaller-diameter portions 74J and the inner circumferential surface of the reception hole 9D during forward rotation of the rotor 34.

Thus, the lock pins 79 do not serve as wedges and allow the countershaft 74 and the spindle 9 to rotate relative to each other. Thus, a rotational force from the rotor 34 is not transmitted to the spindle 9 through the spindle locking assembly 8B including the countershaft 74 and the lock pins 79 during forward rotation of the rotor 34. A rotational force from the rotor 34 is transmitted to the spindle 9 through the clutch assembly 8A during forward rotation of the rotor 34.

The spindle locking assembly 8B in the embodiment has the pin grooves 9L on the inner circumferential surface of the reception hole 9D, and the pin grooves 9L receive at least parts of the lock pins 79.

The lock pins 79 received in the pin grooves 9L effectively lock the countershaft 74 and the spindle 9.

The spindle locking assembly 8B in the embodiment has multiple pin grooves 9L circumferentially arranged on the inner circumferential surface of the reception hole 9D.

Thus, the countershaft 74 and the spindle 9 are locked effectively at an intended position in the rotation direction of the spindle 9. The pin grooves 9L may be on a surface other than the inner circumferential surface of the reception hole 9D.

Each pin groove 9L in the embodiment has its rear end located frontward from the rear end of the reception hole 9D. At the retracted position of the spindle 9 with the lock pins 79 between the outer circumferential surfaces of the larger-diameter portions 74K and the inner circumferential surface of the reception hole 9D, the lock pins 79 are received in the pin grooves 9L.

Thus, when the spindle 9 moves to the retracted position in response to the pressing operation, the countershaft 74 and the spindle 9 are locked effectively.

The pin support 74E in the embodiment includes the ridges 74M on the outer circumferential surface of its rear portion. At the advanced position of the spindle 9 with the lock pins 79 between the outer circumferential surfaces of the larger-diameter portions 74K and the inner circumferential surface of the reception hole 9D, the lock pins 79 move radially to be removed from the pin grooves 9L when the ridges 74M come in contact with the lock pins 79.

Thus, the lock pins 79 are removed from the pin grooves 9L without the countershaft 74 and the spindle 9 being locked, unless the pressing operation is performed during reverse rotation of the rotor 34.

The countershaft 74 in the embodiment includes, at the rear end of the pin support 74E, the stop surfaces 74G facing the rear end faces of the lock pins 79. The spindle locking assembly 8B includes the compression spring 81 urging the lock pins 79 backward to press the rear end faces of the lock pins 79 against the stop surfaces 74G.

This restricts relative movement between the countershaft 74 and the lock pins 79 in the front-rear direction.

The spindle locking assembly 8B in the embodiment includes the sleeve 80 in contact with the front end faces of the lock pins 79. The compression spring 81 has the rear end connected to the sleeve 80. The compression spring 81 has the front end connected to the support surface 9E defining the front portion of the reception hole 9D.

Thus, an urging force from the compression spring 81 is appropriately applied to the lock pins 79.

The clutch assembly 8A in the embodiment includes the clutch cam 72 surrounding the countershaft 74 and including the drive cams 72C, and the follower cams 9G located on the spindle 9 and facing the drive cams 72C.

Thus, a rotational force from the rotor 34 is transmitted to the spindle 9 through the clutch assembly 8A with the drive cams 72C in contact with the follower cams 9G during forward rotation of the rotor 34.

Other Embodiments

In the above embodiment, the sleeve 76 is in contact with the rear O-ring 77. The rear O-ring 77 may be eliminated. The rear end of the inner circumferential surface of the sleeve 76 may be in contact with the cam ring 72A in the clutch cam 72. In some embodiments, the rear end of the inner circumferential surface of the sleeve 76 may be fixed to the cam ring 72A.

In the above embodiment, the sleeve 76 is in contact with the front O-ring 78. The front O-ring 78 may be eliminated. The front end of the inner circumferential surface of the sleeve 76 may be in contact with the flange 9B on the spindle 9 in a manner movable relative to each other. In some embodiments, the sleeve 76 may be a seal. In some embodiments, a non-sealing elastic member may be used in place of the front O-ring 78.

In the above embodiment, the countershaft 74 and the spindle 9 are locked when the spindle 9 moves to the retracted position during reverse rotation of the rotor 34. The countershaft 74 and the spindle 9 may be locked at the advanced position of the spindle 9 during reverse rotation of the rotor 34. In other words, at the advanced position of the spindle 9 with the lock pins 79 between the outer circumferential surfaces of the larger-diameter portions 74K and the inner circumferential surface of the reception hole 9D, the lock pins 79 may be received in the pin grooves 9L.

In the above embodiment, without the pin grooves 9L, the countershaft 74 and the spindle 9 may be locked by the lock pins 79 between the outer circumferential surfaces of the larger-diameter portions 74K and the inner circumferential surface of the reception hole 9D, and the countershaft 74 and the spindle 9 may be unlocked when the lock pins 79 are between the outer circumferential surfaces of the smaller-diameter portions 74J and the inner circumferential surface of the reception hole 9D.

In the above embodiment, the spindle locking assembly 8B includes the countershaft 74 rotatable by the rotor 34, the cylindrical portion 9P of the spindle 9 surrounding the countershaft 74, the lock pins 79 between the outer circumferential surface of the countershaft 74 and the inner circumferential surface of the cylindrical portion 9P, and the pin grooves 9L on the inner circumferential surface of the cylindrical portion 9P and receiving at least parts of the lock pins 79. The spindle locking assembly 8B may have any structure that is between the rotor 34 and spindle 9. For example, a cylindrical portion may surround the rotor shaft 41 in the motor 6, pin grooves may be located on the inner circumferential surface of the cylindrical portion, and lock pins may be between the outer circumferential surface of the rotor shaft 41 and the inner circumferential surface of the cylindrical portion.

In the above embodiment, the screwdriver 1 may use utility power (alternating current power supply) in place of the battery pack 25.

REFERENCE SIGNS LIST 1 screwdriver
2 main housing
2A fan case
2B pin
2C support rib
2L left housing
2R right housing
2S screw
3 gear housing
3C seal ring
3S screw
4 hook
4S screw
5 battery mount
6 motor
7 fan
8 power transmission
8A clutch assembly
8B spindle locking assembly
9 spindle
9A rod
9B flange
9C bit holding hole
9D reception hole
9E support surface
9F through-hole
9G follower cam
9H ring groove
9J front cam
9K groove
9L pin groove
9M cylinder
9N slope
9P cylindrical portion
10 tool holder
11 lock ring
11A threaded groove
12 adjusting sleeve
13 rubber cap
14 trigger lever
15 lock button
16 forward-reverse switch lever
17 light
18 switch plate
18A mode switch button
19 push-drive assembly
20 controller
20A circuit board
20B case
21 motor compartment
21A recess
22 handle
22A grip
22B joint
23 battery holder
24 joint
25 battery pack
26 inlet
27 outlet
28 hand strap
29 sleeve
30 driver bit
30A recess
31 rear housing
31A plate
31B recess
31C cylinder
32 front housing
32A plate
32B cylindrical portion
32C thread
33 stator
34 rotor
35 stator core
36F front insulator
36R rear insulator
37 coil
38 short-circuiting member
39 connector
39S screw
40 rotor core
41 rotor shaft
42 rotor magnet
43 rotation sensor board
43S screw
44 rotor bearing
45 rotor bearing
46 circlip
47 pinion gear
48 spindle bearing
48A groove
49 ball
50 leaf spring
51 leaf spring
52 O-ring
53 cup washer
54 switch
55 rod
56 seal
57 lever
57A pivotable portion
57B first projection
57C second projection
58 torsion spring
59 magnet
60 mode sensor board 61 circlip
62 shaft bearing
63 oil seal
64 O-ring
71 drive gear
71A ring
71B gear
71C cylindrical portion
71D gear ball groove
72 clutch cam
72A cam ring
72B ring groove
72C drive cam
72D cam ball groove
73 ball
74 countershaft
74A through-hole
74B bearing receiver
74C gear fixing portion
74d intermediate portion
74E pin support
74F sleeve support
74G stop surface
74H protrusion
74J smaller-diameter portion
74K larger-diameter portion
74M ridge
75 compression spring
76 sleeve
76A cylindrical portion
76B stopper
77 rear O-ring
78 front O-ring
79 lock pin
80 sleeve
80A recess
81 compression spring
82 brake member
82A brake ring
82B recess
82C brake cam
AX rotation axis
CX rotation axis

What is claimed is:

1. A screwdriver, comprising:
a housing;
a motor including a stator and a rotor rotatable relative to the stator;
a spindle including a rod to which a tip tool is attachable, the spindle being supported by the housing in a manner movable between an advanced position and a retracted position in a front-rear direction, the spindle having a reception hole extending frontward from a rear end face of the spindle;
a clutch assembly configured to transmit a rotational force from the rotor to the spindle in response to the spindle moving to the retracted position during forward rotation of the rotor; and
a spindle locking assembly configured to transmit a rotational force from the rotor to the spindle during reverse rotation of the rotor, the spindle locking assembly including
the reception hole, and
a countershaft placed in the reception hole.

2. The screwdriver according to claim 1, wherein
the spindle locking assembly transmits the rotational force from the rotor to the spindle in response to the spindle moving to the retracted position.

3. The screwdriver according to claim 2, wherein
the countershaft placed in the reception hole includes a front portion defining a pin support,
the pin support includes
a larger-diameter portion, and
a smaller-diameter portion at a position circumferentially different from a position of the larger-diameter portion,
a radial distance from a rotation axis to an outer circumferential surface of the larger-diameter portion is greater than a radial distance from the rotation axis to an outer circumferential surface of the smaller-diameter portion,
the spindle locking assembly includes a lock pin surrounding the pin support, and
the lock pin is held between the outer circumferential surface of the larger-diameter portion and an inner circumferential surface of the reception hole during reverse rotation of the rotor.

4. The screwdriver according to claim 1, wherein
the countershaft placed in the reception hole includes a front portion defining a pin support,
the pin support includes
a larger-diameter portion, and
a smaller-diameter portion at a position circumferentially different from a position of the larger-diameter portion,
a radial distance from a rotation axis to an outer circumferential surface of the larger-diameter portion is greater than a radial distance from the rotation axis to an outer circumferential surface of the smaller-diameter portion,
the spindle locking assembly includes a lock pin surrounding the pin support, and
the lock pin is held between the outer circumferential surface of the larger-diameter portion and an inner circumferential surface of the reception hole during reverse rotation of the rotor.

5. The screwdriver according to claim 4, wherein
the lock pin is between the outer circumferential surface of the smaller-diameter portion and the inner circumferential surface of the reception hole during forward rotation of the rotor.

6. The screwdriver according to claim 5, wherein
the spindle locking assembly has a pin groove on the inner circumferential surface of the reception hole, and the pin groove receives at least a part of the lock pin.

7. The screwdriver according to claim 5, wherein
the countershaft includes, at a rear end of the pin support, a stop surface facing a rear end face of the lock pin, and
the spindle locking assembly includes a compression spring urging the lock pin backward to press the rear end face of the lock pin against the stop surface.

8. The screwdriver according to claim 4, wherein
the spindle locking assembly has a pin groove on the inner circumferential surface of the reception hole, and the pin groove receives at least a part of the lock pin.

9. The screwdriver according to claim 8, wherein
the spindle locking assembly has a plurality of the pin grooves circumferentially arranged on the inner circumferential surface of the reception hole.

10. The screwdriver according to claim 9, wherein
the pin groove has a rear end located frontward from a rear end of the reception hole, and at the retracted position of the spindle with the lock pin between the outer circumferential surface of the larger-diameter portion and the inner circumferential surface of the reception hole, the lock pin is received in the pin groove.

11. The screwdriver according to claim 9, wherein
the countershaft includes, at a rear end of the pin support, a stop surface facing a rear end face of the lock pin, and
the spindle locking assembly includes a compression spring urging the lock pin backward to press the rear end face of the lock pin against the stop surface.

12. The screwdriver according to claim 8, wherein
the pin groove has a rear end located frontward from a rear end of the reception hole, and
at the retracted position of the spindle with the lock pin between the outer circumferential surface of the larger-diameter portion and the inner circumferential surface of the reception hole, the lock pin is received in the pin groove.

13. The screwdriver according to claim 12, wherein
the pin support includes a ridge on an outer circumferential surface of a rear portion of the pin support, and
at the advanced position of the spindle with the lock pin between the outer circumferential surface of the larger-diameter portion and the inner circumferential surface of the reception hole, the lock pin moves radially to be removed from the pin groove in response to the ridge coming in contact with the lock pin.

14. The screwdriver according to claim 13, wherein
the countershaft includes, at a rear end of the pin support, a stop surface facing a rear end face of the lock pin, and
the spindle locking assembly includes a compression spring urging the lock pin backward to press the rear end face of the lock pin against the stop surface.

15. The screwdriver according to claim 12, wherein
the countershaft includes, at a rear end of the pin support, a stop surface facing a rear end face of the lock pin, and
the spindle locking assembly includes a compression spring urging the lock pin backward to press the rear end face of the lock pin against the stop surface.

16. The screwdriver according to claim 4, wherein
the countershaft includes, at a rear end of the pin support, a stop surface facing a rear end face of the lock pin, and
the spindle locking assembly includes a compression spring urging the lock pin backward to press the rear end face of the lock pin against the stop surface.

17. The screwdriver according to claim 4, wherein
the countershaft includes, at a rear end of the pin support, a stop surface facing a rear end face of the lock pin, and
the spindle locking assembly includes a compression spring urging the lock pin backward to press the rear end face of the lock pin against the stop surface.

18. The screwdriver according to claim 17, wherein
the spindle locking assembly includes a sleeve in contact with a front end face of the lock pin,
the compression spring has a rear end connected to the sleeve, and
the compression spring has a front end connected to a support surface defining a front portion of the reception hole.

19. The screwdriver according to claim 1, wherein
the clutch assembly includes
a clutch cam surrounding the countershaft and including a drive cam, and
a follower cam located on the spindle and facing the drive cam.

20. A screwdriver, comprising:
a housing;
a motor including a stator and a rotor rotatable relative to the stator;
a spindle including a rod to which a tip tool is attachable, the spindle being supported by the housing in a manner movable between an advanced position and a retracted position in a front-rear direction;
a clutch assembly configured to transmit a rotational force from the rotor to the spindle in response to the spindle moving to the retracted position during forward rotation of the rotor; and
a spindle locking assembly configured to transmit a rotational force from the rotor to the spindle during reverse rotation of the rotor, the spindle locking assembly including
a shaft rotatable by the rotor,
a cylindrical portion surrounding the shaft,
a lock pin between an outer circumferential surface of the shaft and an inner circumferential surface of the cylindrical portion, and
a pin groove located on the inner circumferential surface of the cylindrical portion and receiving at least a part of the lock pin.

* * * * *